United States Patent
Kawai et al.

(10) Patent No.: US 6,336,018 B1
(45) Date of Patent: *Jan. 1, 2002

(54) ELECTROPHOTOGRAPHIC IMAGE FORMING APPARATUS, PROCESS CARTRIDGE, AND DRIVE MOUNT FOR PHOTOSENSITIVE DRUM

(75) Inventors: Toshiharu Kawai, Susono; Kazushi Watanabe, Mishima; Yoshihiro Ito, Shizuoka-ken, all of (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 08/938,959

(22) Filed: Sep. 26, 1997

(30) Foreign Application Priority Data

Sep. 26, 1996  (JP) ............................... 8-277523

(51) Int. Cl.[7] .............................................. G03G 15/00
(52) U.S. Cl. ........................................ 399/117; 399/167
(58) Field of Search ................................ 399/117, 167; 403/361, 383; 492/15; 464/179, 182

(56) References Cited

U.S. PATENT DOCUMENTS

| | | | |
|---|---|---|---|
| 3,213,719 A | * 10/1965 | Kloack | |
| 3,536,397 A | * 10/1970 | Wagner | |
| 3,734,548 A | * 5/1973 | Kieves | |
| 3,815,380 A | * 6/1974 | Esmay | 464/173 |
| 4,025,210 A | * 5/1977 | Johnson | 403/240 |
| 4,454,922 A | * 6/1984 | Jamison et al. | |
| 4,621,919 A | * 11/1986 | Nitanda et al. | 399/117 |
| 4,829,335 A | 5/1989 | Kanemitsu et al. | |
| 4,922,297 A | * 5/1990 | Kondo | 399/117 |
| 4,975,743 A | 12/1990 | Surti | |
| 4,989,037 A | * 1/1991 | Nagatsuna | 399/167 |
| 5,023,660 A | 6/1991 | Ebata et al. | |
| 5,132,728 A | * 7/1992 | Suzaki et al. | 399/167 |
| 5,284,455 A | * 2/1994 | Kuribayshai | 464/105 |
| 5,402,207 A | * 3/1995 | Michlin | 399/117 |
| 5,597,261 A | * 1/1997 | Hayashi | 403/354 |
| 5,602,623 A | 2/1997 | Nishibata et al. | 399/111 |
| 5,740,500 A | * 4/1998 | Hashimoto | 399/114 |
| 5,749,028 A | * 5/1998 | Damji et al. | 399/117 |
| 5,768,658 A | * 6/1998 | Watanabe et al. | 399/111 |

FOREIGN PATENT DOCUMENTS

| | | | |
|---|---|---|---|
| EP | 735432 | * | 10/1996 |
| EP | 0 797 125 | | 9/1997 |
| GB | 2214609 | * | 9/1989 |

\* cited by examiner

Primary Examiner—Robert Beatty
(74) Attorney, Agent, or Firm—Fitzpatrick, Cella, Harper & Scinto

(57) ABSTRACT

A process cartridge detachably mountable to a main assembly of an electrophotographic image forming apparatus, wherein the main assembly includes a motor, a main assembly side gear for receiving driving force from the motor and a hole defined by twisted surfaces, the hole being substantially coaxial with the gear; an electrophotographic photosensitive drum; process device actable on the photosensitive drum; and a projection provided at a longitudinal end of the photosensitive drum. The projection has an engaging portion for engagement with the twisted surfaces and a supporting portion for supporting the engaging portion. The supporting portion is capable of entering the hole, and wherein when the main assembly side gear rotates with the hole and the engaging portion of the projection engaged with each other, rotational driving force is transmitted from the gear to the photosensitive drum through engagement between the hole and the projection, and the projection is urged inwardly of the hole.

79 Claims, 21 Drawing Sheets

ELECTROPHOTOGRAPHIC IMAGE FORMING APPARATUS, PROCESS CARTRIDGE, AND DRIVE MOUNT FOR PHOTOSENSITIVE DRUM

FIELD OF THE INVENTION AND RELATED ART

The present invention relates to a process cartridge and an electrophotographic image forming apparatus.

Here, the electrophotographic image forming apparatus forms an image on a recording material using an electrophotographic image formation process. Examples of the electrophotographic image forming apparatus includes an electrophotographic copying machine, an electrophotographic printer (laser beam printer, LED printer or the like), a facsimile machine and a word processor or the like.

The process cartridge contains integrally an electrophotographic photosensitive member and charging means, developing means or cleaning means, and is detachably mountable relative to a main assembly of the image forming apparatus. It may integrally contain the electrophotographic photosensitive member and at least one of the charging means, the developing means and the cleaning means. As another example, it may contain the electrophotographic photosensitive member and at least the developing means.

In an electrophotographic image forming apparatus using an electrophotographic image forming process, the process cartridge is used, which contains the electrophotographic photosensitive member and process means actable on said electrophotographic photosensitive member, and which is detachably mountable as a unit to a main assembly of the image forming apparatus (process cartridge type). With this process cartridge type, maintenance of the apparatus can be carried out in effect by the user without depending on a serviceman. Therefore, the process cartridge type is now widely used in electrophotographic image forming apparatuses.

The present invention is directed to a further improvement of such a process cartridge.

A driving system for a photosensitive member in a process cartridge type, is disclosed in U.S. Pat. Nos. 4,829, 335 and 5,023,660.

SUMMARY OF THE INVENTION

The object of the present invention is to provide a process cartridge comprising an electrophotographic photosensitive drum with improved rotational accuracy, and also to provide a process cartridge employing such an electrophotographic photosensitive drum, and an electrophotographic image forming apparatus compatible with such a process cartridge.

Another object of the present invention is to provide a process cartridge, the electrophotographic photosensitive drum of which is positioned with improved accuracy, relative to the main assembly of an electrophotographic image forming apparatus, by drawing the electrophotographic photosensitive drum toward the apparatus main assembly while transmitting driving force, and also to provide an electrophotographic image forming apparatus compatible with such a process cartridge.

Another object of the present invention is to provide a process cartridge, which is positioned with improved accuracy, relative to the main apparatus of an electrophotographic image forming apparatus, by drawing the electrophotographic photosensitive drum toward the apparatus main assembly while transmitting driving force, and also to provide an electrophotographic image forming apparatus compatible with such a process cartridge.

Another object of the present invention is to provide a process cartridge that is detachably mountable to the main assembly of an electrophotographic image forming apparatus, wherein the main assembly includes: a motor; a main assembly side gear for receiving driving force from the motor; a hole defined by twisted surfaces, the hole being substantially coaxial with the gear; an electrophotographic photosensitive drum; process means actable on the photosensitive drum; and a projection being provided at a longitudinal end of the photosensitive drum, wherein the projection includes a plurality of contact portions which come in contact with the twisted surfaces, and a support portion which supports the contact portions, and can be drawn into the hole, and wherein when the main assembly side gear rotates with the hole, and the contact portion of the projection engages with the hole, rotational driving force is transmitted from the gear to the photosensitive drum through the engagement between the hole and the projection, and force is generated in the direction to draw the projection into the hole.

These and other objects, features and advantages of the present invention will become more apparent upon a consideration of the following description of the preferred embodiments of the present invention taken in conjunction with the accompanying drawings.

DESCRIPTION OF THE PREFERRED EMBODIMENTS

Hereinafter, the embodiments of the present invention will be described with reference to the drawings.

Next, desirable embodiments of the present invention will be described. In the following description, the "widthwise" direction of a process cartridge B means the direction in which the process cartridge B is installed into, or removed from, the main assembly of an image forming apparatus, and coincides with the direction in which a recording medium is conveyed. The "lengthwise" direction of the process cartridge B means a direction which is intersectional with (substantially perpendicular to) the direction in which the process cartridge B is installed into, or removed from, the main assembly 14. The lengthwise direction is parallel to the surface of the recording medium, and intersectional with (substantially perpendicular to) the direction in which the recording medium is conveyed. Further, the "left" or "right" means the left or right relative to the direction in which the recording medium is conveyed, as seen from above.

Figure 1:
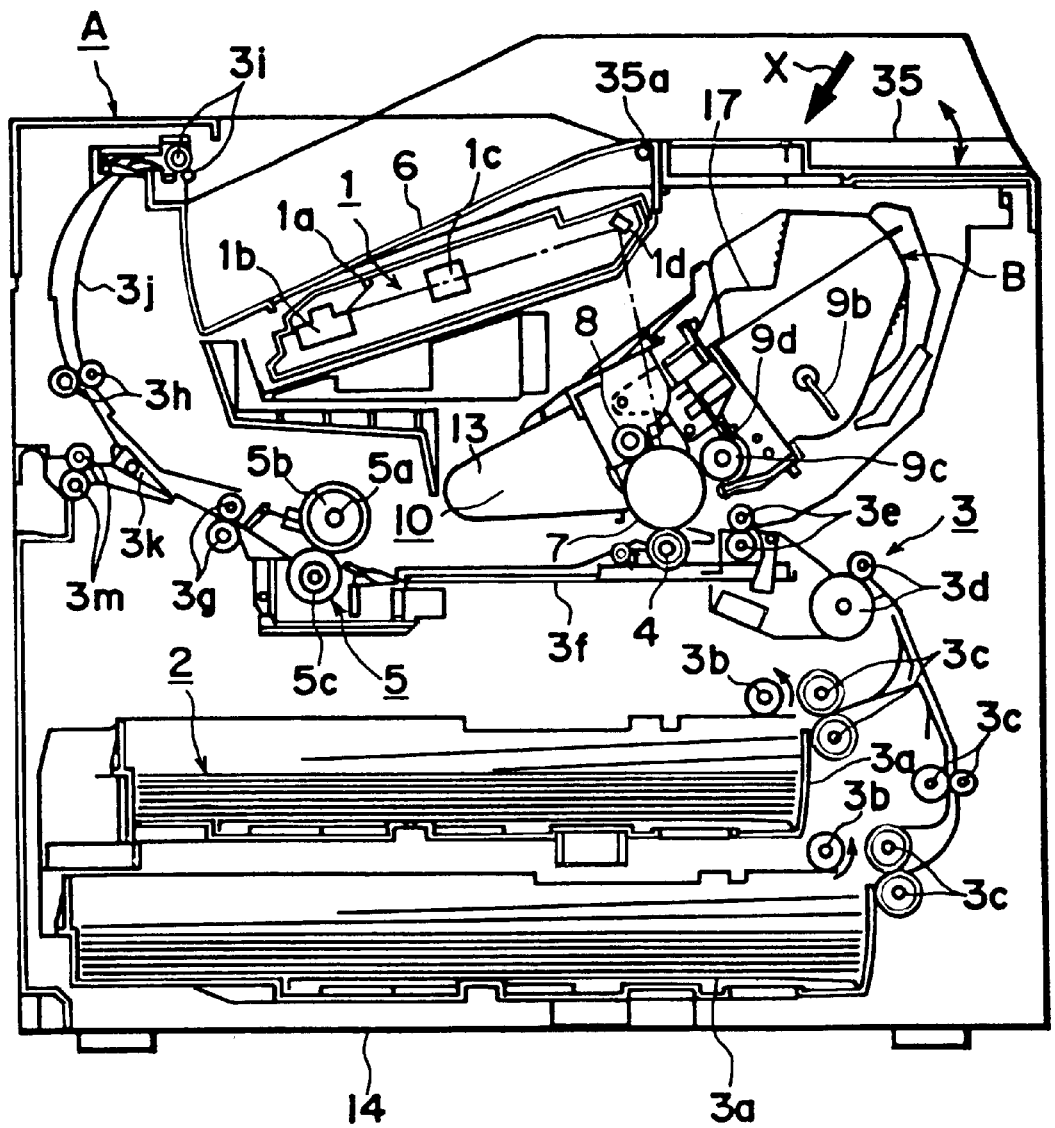
FIG. 1 is a vertical section of an electrophotographic image forming apparatus.
Figure 2:
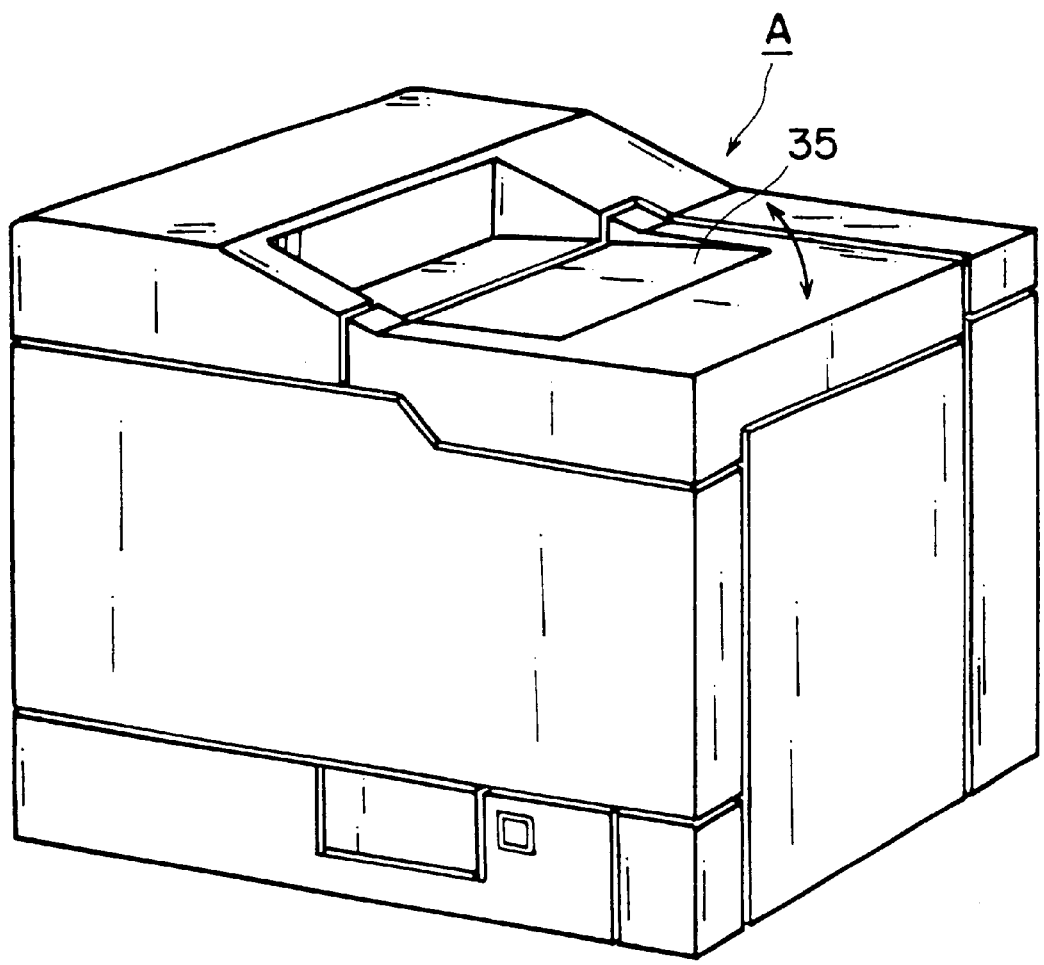
FIG. 2 is an external perspective view of the apparatus illustrated in FIG. 1.
Figure 3:
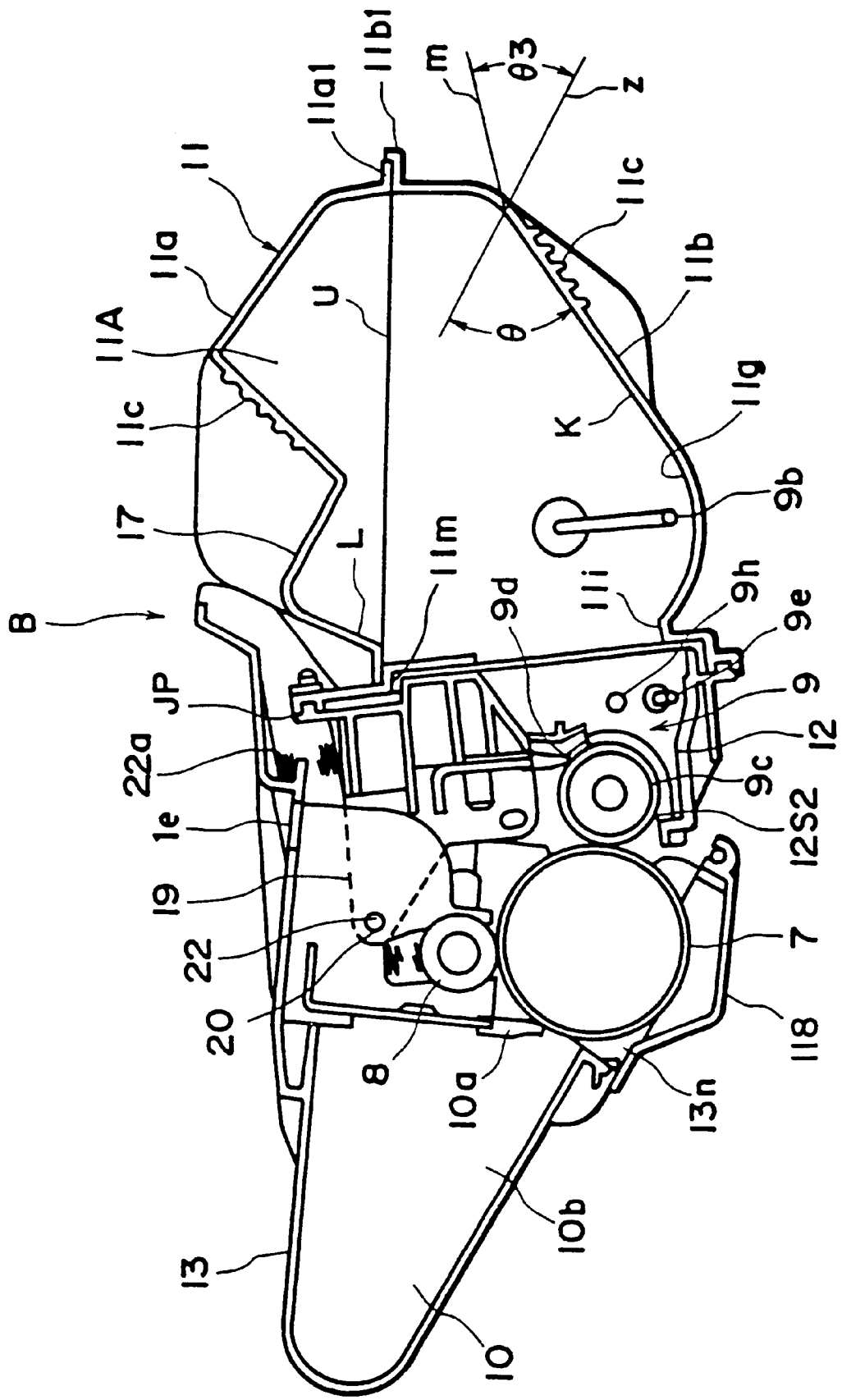
FIG. 3 is a cross-section of a process cartridge.
Figure 4:
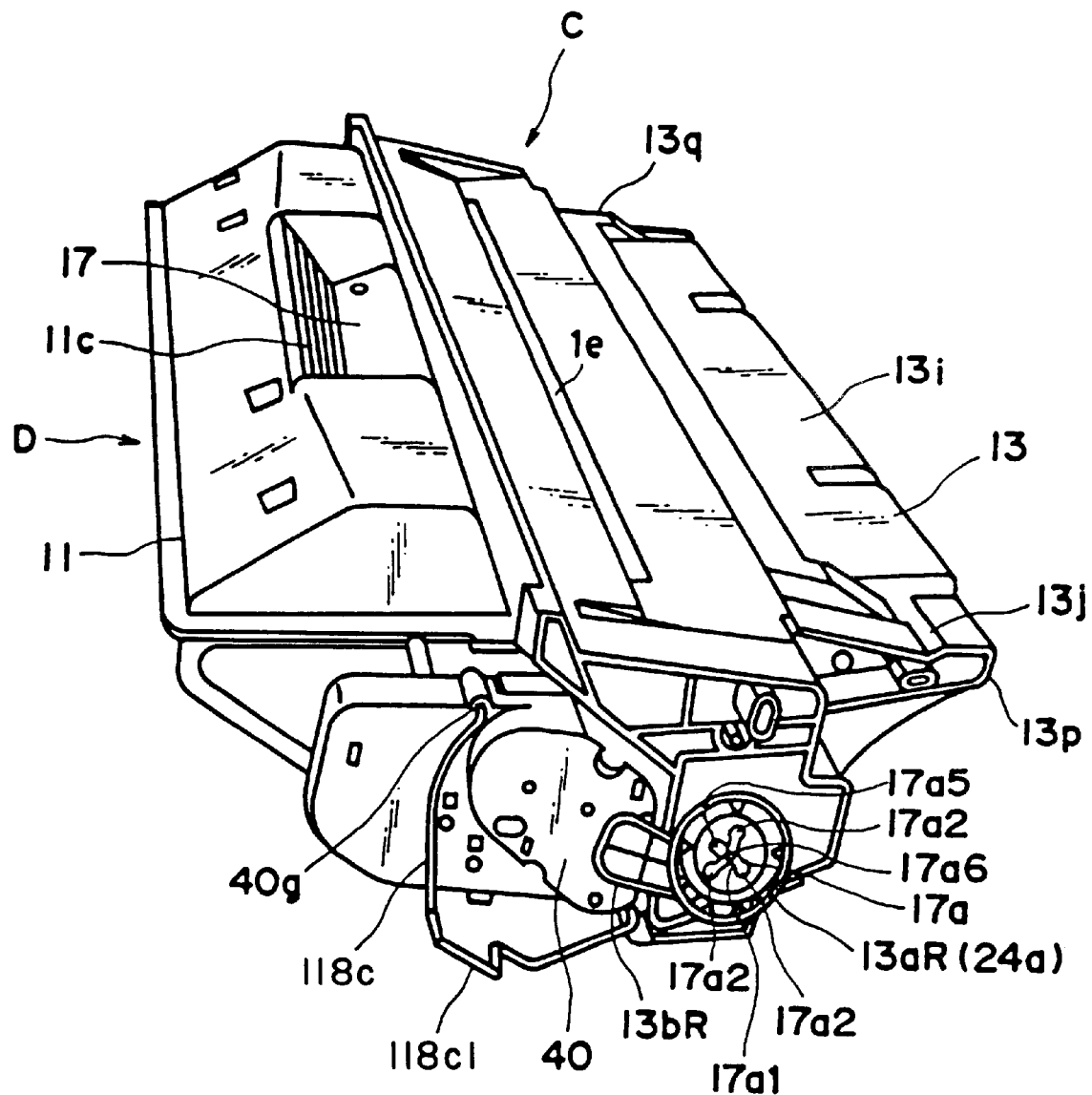
FIG. 4 is an external perspective view of the process cartridge illustrated in FIG. 3, as seen from the top right direction.
Figure 5:
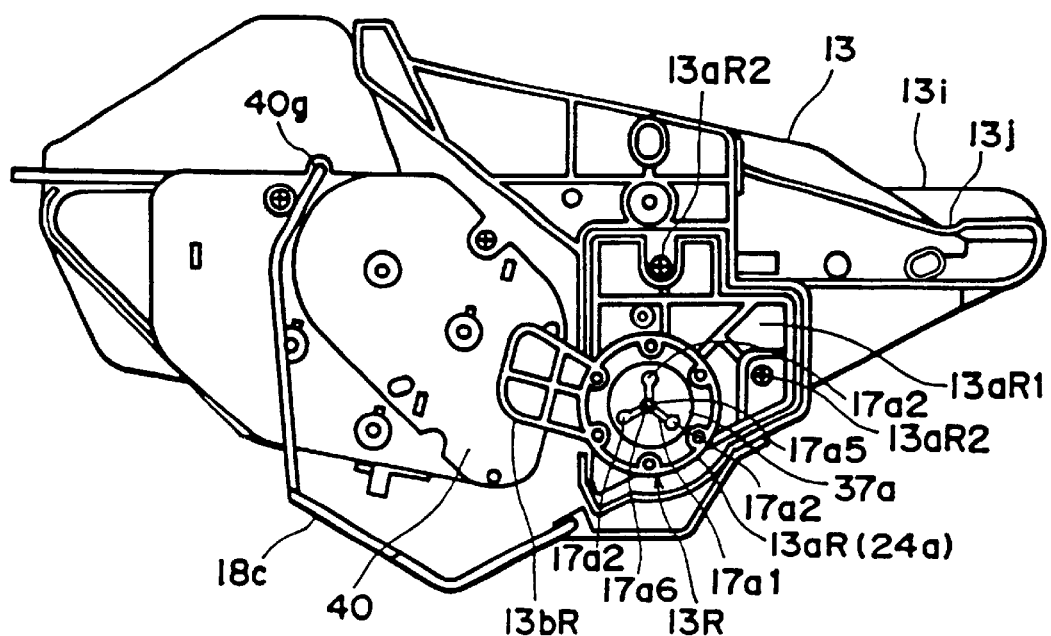
FIG. 5 is the right-hand side view of the process cartridge illustrated in FIG. 3.
Figure 6:
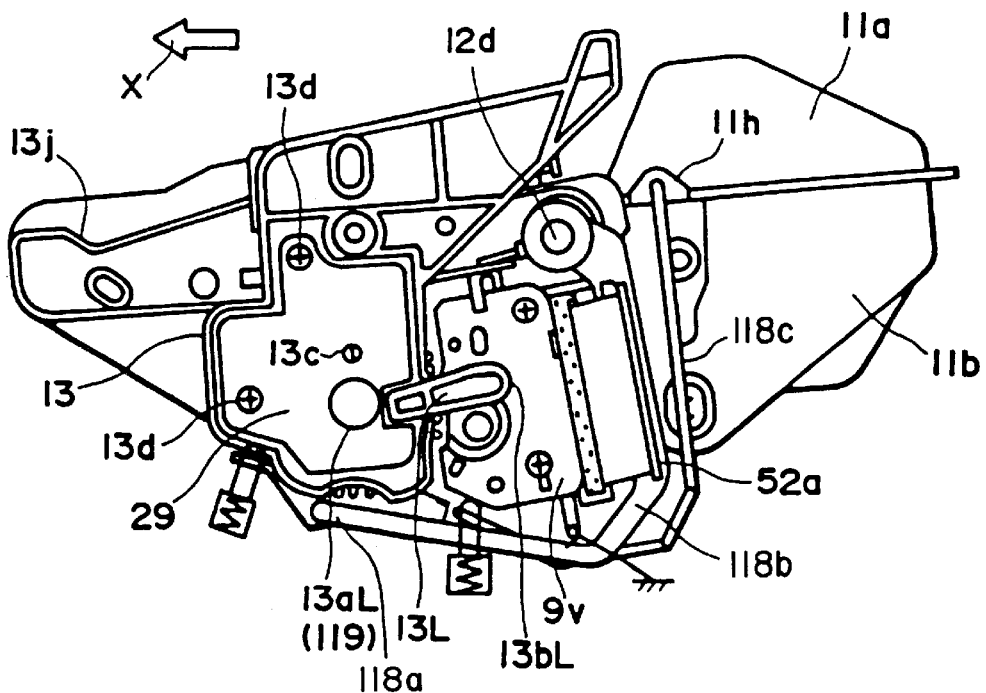
FIG. 6 is the left-hand side view of the process cartridge illustrated in FIG. 3.
Figure 7:
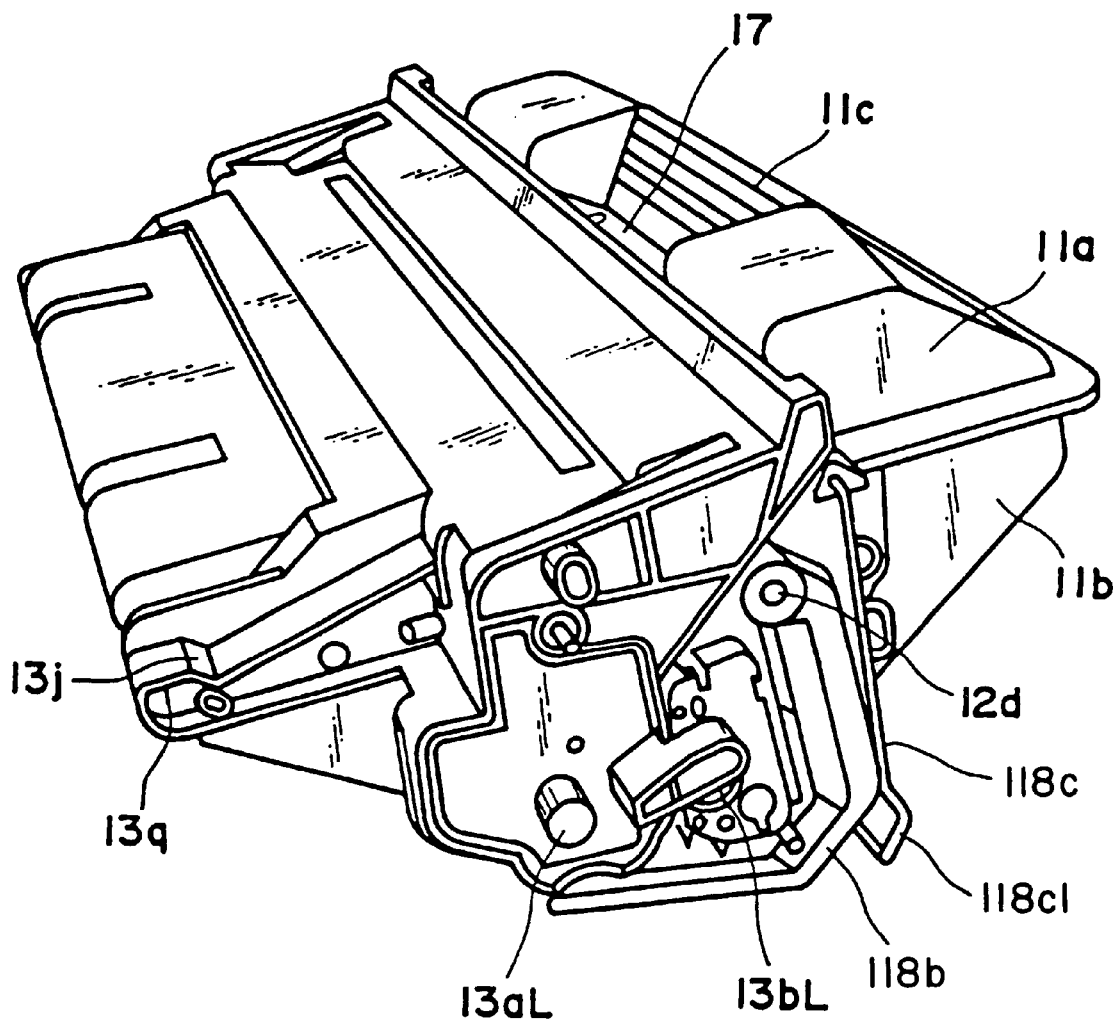
FIG. 7 is an external perspective view of the process cartridge illustrated in FIG. 3, as seen from the top left direction.
Figure 8:
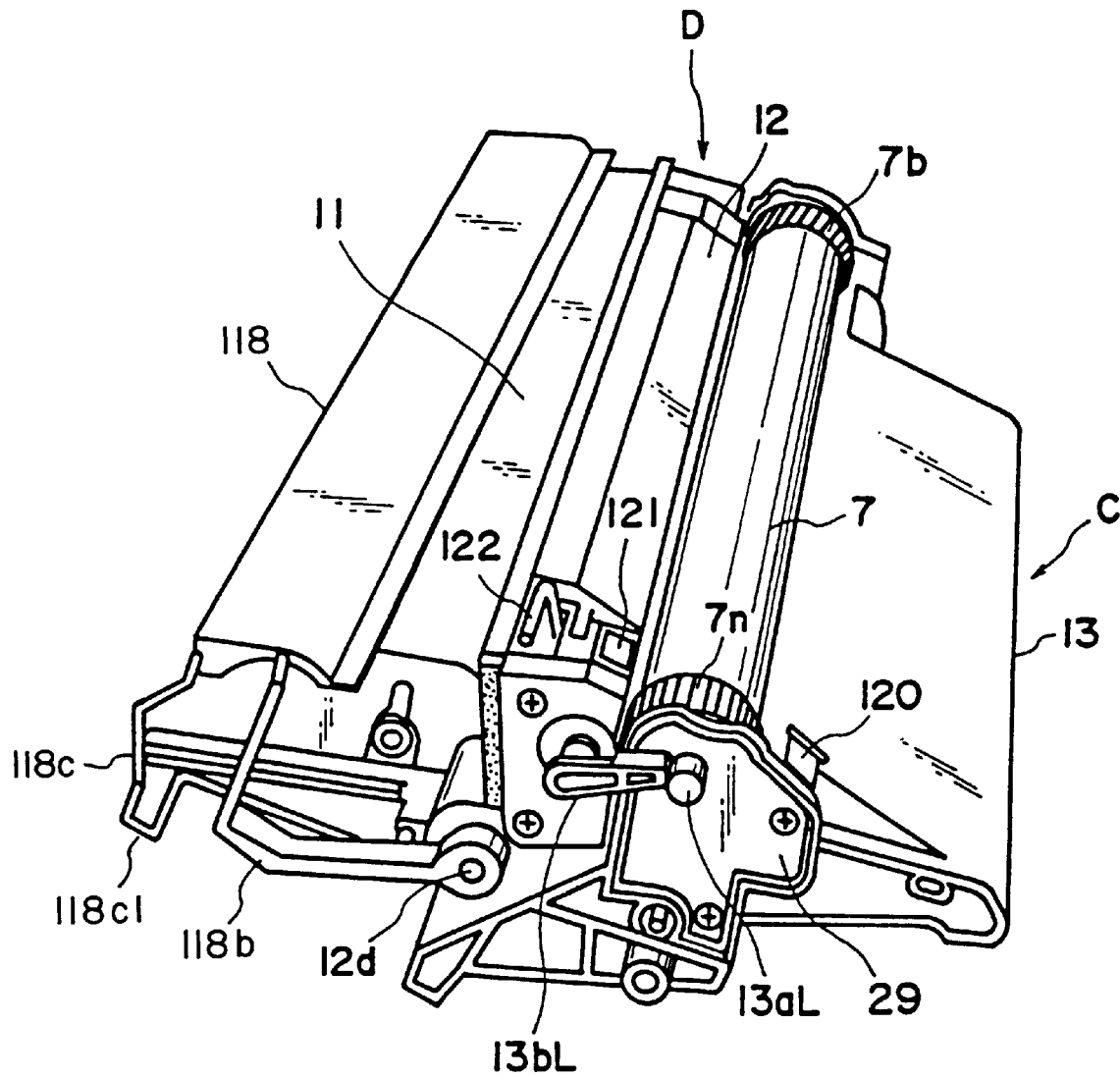
FIG. 8 is an external perspective view of the bottom left side of the process cartridge illustrated in FIG. 3.

FIG. 1 is an electrophotographic image forming apparatus (laser beam printer) which embodies the present invention, depicting the general structure thereof; FIG. 2, an external perspective thereof; and FIGS. 3–8 are drawings of process cartridges which embody the present invention. More specifically, FIG. 3 is a cross-section of a process cartridge; FIG. 4, an external perspective view of the process cartridge; FIG. 5, a right-hand side view of the process cartridge; FIG. 6, a left-hand side view of the process cartridge; FIG. 7, a perspective view of the process cartridge as seen from the top left direction; and FIG. 8 is a perspective view of the process cartridge as seen from the bottom left direction. In the following description, the "top" surface of the process cartridge B means the surface which faces upward when the process cartridge B is in the main assembly 14 of the image forming apparatus, and the "bottom" surface means the surface which faces downward.

(Electrophotographic Image Forming Apparatus A and Process Cartridge B)

First, referring to FIGS. 1 and 2, a laser beam printer A as an electrophotographic image forming apparatus which embodies the present invention will be described. FIG. 3 is a cross-section of a process cartridge which also embodies the present invention.

Referring to FIG. 1, the laser beam printer A is an apparatus which forms an image on a recording medium (for example, recording sheet, OHP sheet, and fabric) through an electrophotographic image forming process. It forms a toner image on an electrophotographic photosensitive drum (hereinafter, photosensitive drum) in the form of a drum. More specifically, the photosensitive drum is charged with the use of a charging means, and a laser beam modulated with the image data of a target image is projected from an optical means onto the charged peripheral surface of the photosensitive drum, forming thereon a latent image in accordance with the image data. This latent image is developed into a toner image by a developing means. Meanwhile, a recording medium 2 placed in a sheet feeding cassette 3a is reversed and conveyed by a pickup roller 3b, a conveyer roller pairs 3c and 3d, and register roller pair 3e, in synchronism with the toner formation. Then, voltage is applied to an image transferring roller 4 as a means for transferring the toner image formed on the photosensitive drum 7 of the process cartridge B, whereby the toner image is transferred onto the recording medium 2. Thereafter, the recording medium 2, onto which the toner image has been transferred, is conveyed to a fixing means 5 by guiding conveyer 3f. The fixing means 5 has a driving roller 5c, and a fixing roller 5b containing a heater 5a, and applies heat and pressure to the recording medium 2 as the recording medium 2 is passed through the fixing means 5, so that the image having been transferred onto the recording medium 2 is fixed to the recording medium 2. Then, the recording medium 2 is conveyed farther, and is discharged into a delivery tray 6 through a reversing path 3j, by discharging roller pairs 3g, 3h and 3i. The delivery tray 6 is located at the top of the main assembly 14 of the image forming apparatus A. It should be noted here that a pivotable flapper 3k may be operated in coordination with a discharge roller pair 3m to discharge the recording medium 2 without passing it through the reversing path 3j. The pickup roller 3b, conveyer roller pairs 3c and 3d, register roller pair 3e, guiding conveyer 3f, discharge roller pairs 3g, 3h and 3i, and discharge roller pair 3m constitute a conveying means 3.

Referring to FIGS. 3–8, in the process cartridge B, on the other hand, the photosensitive drum 7 with a photosensitive layer 7e (FIG. 11) is rotated to uniformly charge its surface by applying voltage to the charging roller 8 as a photosensitive drum charging means. Then, a laser beam modulated with the image data is projected onto the photosensitive drum 7 from the optical system 1 through an exposure opening 1e, forming a latent image on the photosensitive drum 7. The thus formed latent image is developed with the use of toner and the developing means 9. More specifically, the charging roller 8 is disposed in contact with the photosensitive drum 7 to charge the photosensitive drum 7. It is rotated by the rotation of the photosensitive drum 7. The developing means 9 provides the peripheral surface area (area to be developed) of the photosensitive drum 7 with toner so that the latent image formed on the photosensitive drum 7 is developed. The optical system 1 comprises a laser diode 1a, a polygon mirror 1b, a lens 1c, and a deflective mirror 1d (FIG. 1).

In the developing means 9, the toner contained in a toner container 11A is delivered to a developing roller 9c by the rotation of a toner feeding member 9b. The developing roller 9c contains a stationary magnet. It is also rotated so that a layer of toner with triboelectric charge is formed on the peripheral surface of the developing roller 9c. The image developing area of the photosensitive drum 7 is provided with the toner from this toner layer, the toner is transferred onto the peripheral surface of the photosensitive drum 7 in a manner to reflect the latent image, visualizing the latent image as a toner image. The developing blade 9d is a blade which regulates the amount of the toner adhered to the peripheral surface of the developing roller 9c and also triboelectrically charges the toner. Adjacent to the developing roller 9c, a toner stirring member 9e is rotatively disposed to circulatively stir the toner within the image developing chamber.

After the toner image formed on the photosensitive drum 7 is transferred onto the recording medium 2 by applying voltage with polarity opposite to that of the toner image to the image transferring roller 4, the residual toner on the photosensitive drum 7 is removed by the cleaning means 10. The cleaning means 10 comprises an elastic cleaning blade 10a disposed in contact with the photosensitive drum 7, and the toner remaining on the photosensitive drum 7 is scraped off by the elastic cleaning blade 10a, being collected into a waste toner collector 10b.

The process cartridge B is formed in the following manner. First, a toner chamber frame 11, which comprises a toner container (toner storing portion) 11A for storing toner, is joined with an image developing chamber frame 12 which houses the image developing means 9 such as an image developing roller 9c, and then, a cleaning chamber frame 13, in which the photosensitive drum 7, the cleaning means 10 such as the cleaning blade 10a, and the charging roller 8 are mounted, is joined with the preceding two frames 11 and 12 to complete the process cartridge B. The thus formed process cartridge B is removably installable into the main assembly 14 of the image forming apparatus A.

The process cartridge B is provided with an exposure opening through which a light beam modulated with image data is projected onto the photosensitive drum 7, and a transfer opening 13n through which the photosensitive drum 7 opposes the recording medium 2. The exposure opening 1e is a part of the cleaning chamber frame 13, and the transfer opening 13n is located between the image developing chamber frame 12 and the cleaning chamber frame 13.

Next, the structure of the housing of the process cartridge B in this embodiment will be described.

The process cartridge in this embodiment is formed in the following manner. First the toner chamber frame 11 and the image developing chamber frame 12 are joined, and then, the cleaning chamber frame 13 is rotatively joined with the preceding two frames 11 and 12 to complete the housing. In this housing, the aforementioned photosensitive drum 7, charging roller 8, developing means 9, cleaning means 10, and the like, are mounted to complete the process cartridge B. The thus formed process cartridge B is removably installable into the cartridge accommodating means provided in the main assembly 14 of an image forming apparatus.

(Housing Structure of Process Cartridge B)

As described above, the housing of the process cartridge B in this embodiment is formed by joining the toner chamber frame 11, the image developing chamber frame 12, and the cleaning chamber frame 13. Next, the structure of the thus formed housing will be described.

Figure 13:
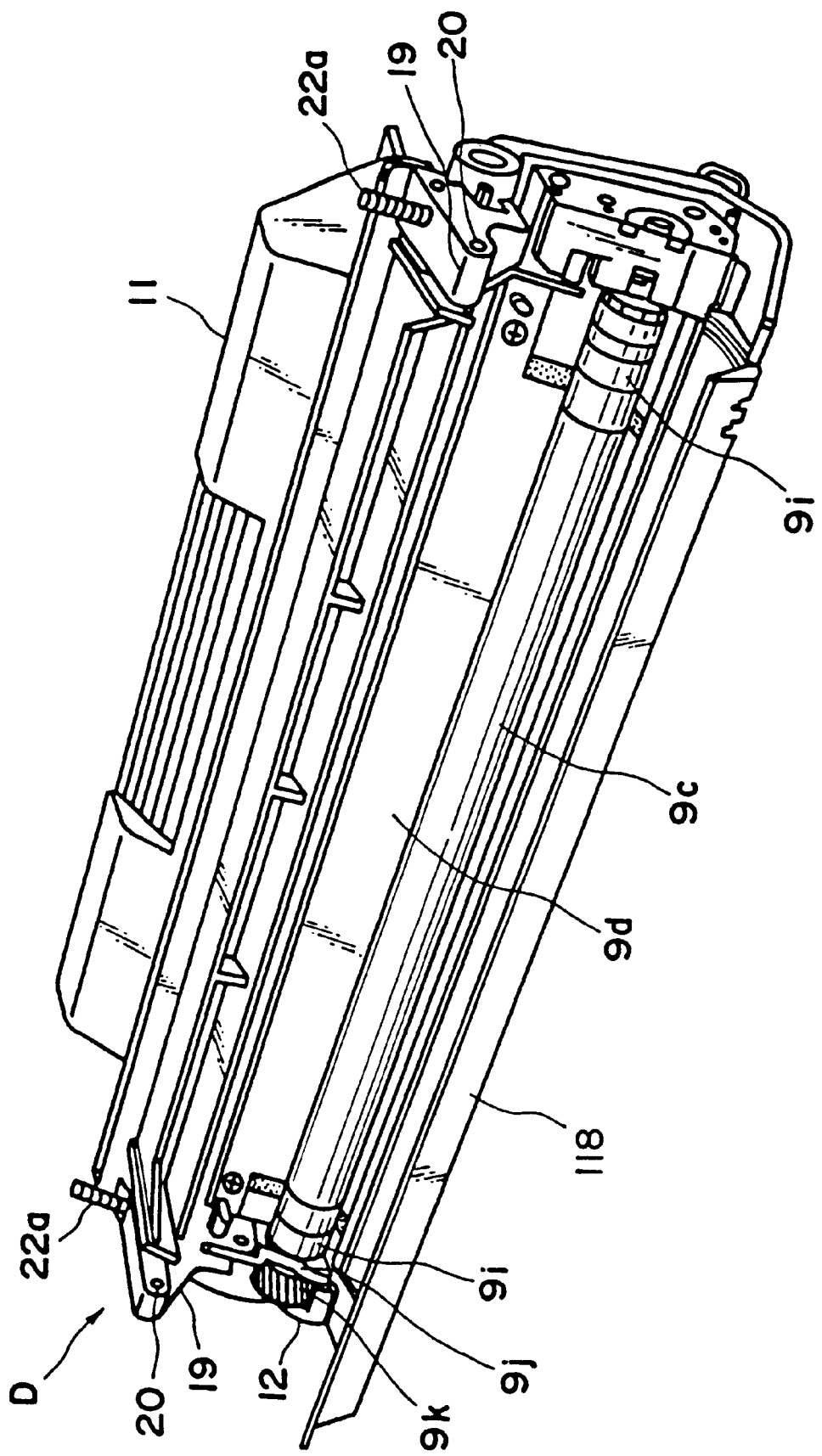
FIG. 13 is a perspective view of an image developing unit.
Figure 19:
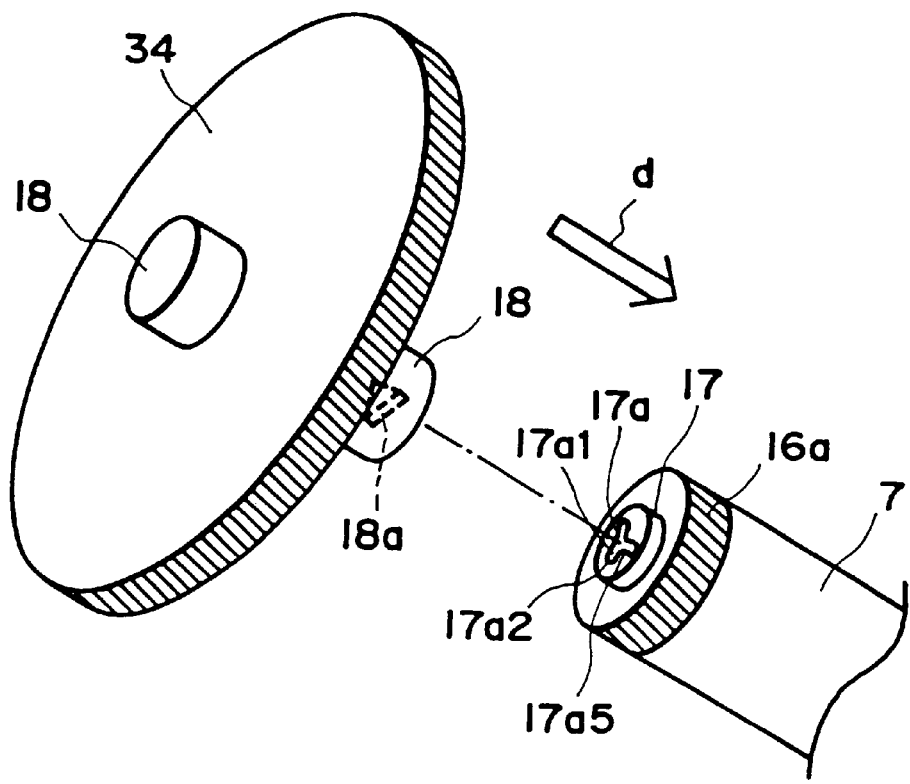
FIG. 19 is a perspective view of the coupling means between a process cartridge and the apparatus main assembly of an image forming apparatus, before engagement, in the first embodiment of the present invention.
Figure 20:
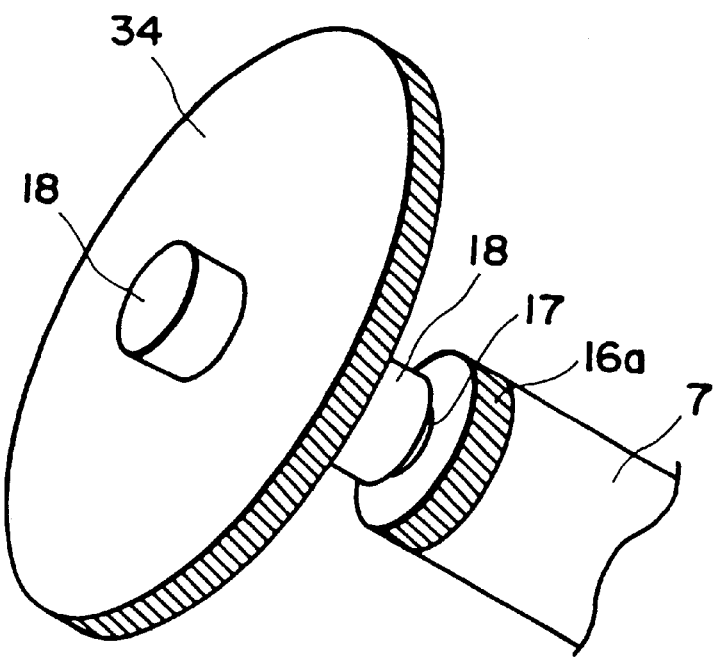
FIG. 20 is a perspective view of the coupling means between a process cartridge and the main assembly of an image forming apparatus, after engagement, in the first embodiment of the present invention.

Referring to FIGS. 3 and 20, in the toner chamber frame 11, the toner feeding member 9b is rotatively mounted. In the image developing chamber frame 12, the image developing roller 9c and the developing blade 9d are mounted, and adjacent to the developing roller 9c, the stirring member 9e is rotatively mounted to circulatively stir the toner within the image developing chamber. Referring to FIGS. 3 and 19, in the image developing chamber frame 12, a rod antenna 9h is mounted, extending in the lengthwise direction of the developing roller 9c substantially in parallel to the developing roller 9c. The toner chamber frame 11 and the development chamber frame 12, which are equipped in the above-described manner, are welded together (in this embodiment, by ultrasonic wave) to form a second frame which constitutes an image developing unit D (FIG. 13).

The image developing unit of the process cartridge B is provided with a drum shutter assembly 18, which covers the photosensitive drum 7 to prevent it from being exposed to light for an extend period of time or from coming in contact with foreign objects when or after the process cartridge B is removed from the main assembly 14 of an image forming apparatus.

Referring to FIG. 6, the drum shutter assembly 18 has a shutter cover 118a which covers or exposes the transfer opening 13n illustrated in FIG. 3, and linking members 118b and 118c which support the shutter cover 118a. On the upstream side relative to the direction in which the recording medium 2 is conveyed, one end of the right-hand side linking member 18c is fitted in a hole 40g of a developing means gear holder 40 as shown in FIGS. 4 and 5, and one end of the left-hand side linking member 118c is fitted in a boss 11h of the bottom portion 11b of the toner chamber frame 11. The other ends of the left-and right-hand linking members 118c are attached to the corresponding lengthwise ends of the shutter cover 118a, on the upstream side relative to the recording medium conveying direction. The linking member 118c is made of metallic rod. Actually, the left- and right-hand linking members 118c are connected through the shutter cover 118a; in other words, the left- and right-hand linking members 118c are the left- and right-hand ends of a single piece linking member 118c. The linking member 118b is provided only on one lengthwise end of the shutter cover 118a. One end of the linking member 118b is attached to the shutter cover 118a, on the downstream side, relative to the recording medium conveying direction, of the position at which the linking member 118c is attached to the shutter cover 118a, and the other end of the linking member 118b is fitted around a dowel 12d of the image development chamber frame 12. The linking member 118b is formed of synthetic resin.

The linking members 118b and 118c, which are different in length, form a four piece linkage structure in conjunction with the shutter cover 118a and the toner chamber frame 11. As the process cartridge B is inserted into an image forming apparatus, the portion 118c1 of the linking member 118c, which projects away from the process cartridge B, comes in contact with the stationary contact member (unillustrated) provided on the lateral wall of the cartridge accommodating space S of the main assembly 14 of the image forming apparatus, and activates the drum shutter assembly 118 to open the shutter cover 118a.

The drum shutter assembly 118, constituted of the shutter cover 118a and the linking members 118b and 118c, is loaded with the pressure from an unillustrated torsional coil spring fitted around a dowel 12d. One end of the spring is anchored to the linking member 118b, and the other end is anchored to the image developing chamber frame 12, so that the pressure is generated in the direction to cause the shutter cover 18a to cover the transfer opening 13n.

Referring again to FIGS. 3 and 12, the cleaning means frame 13 is fitted with the photosensitive drum 7, the charging roller 8, and the various components of the cleaning means 10, to form a first frame as a cleaning unit C (FIG. 12).

Figure 12:
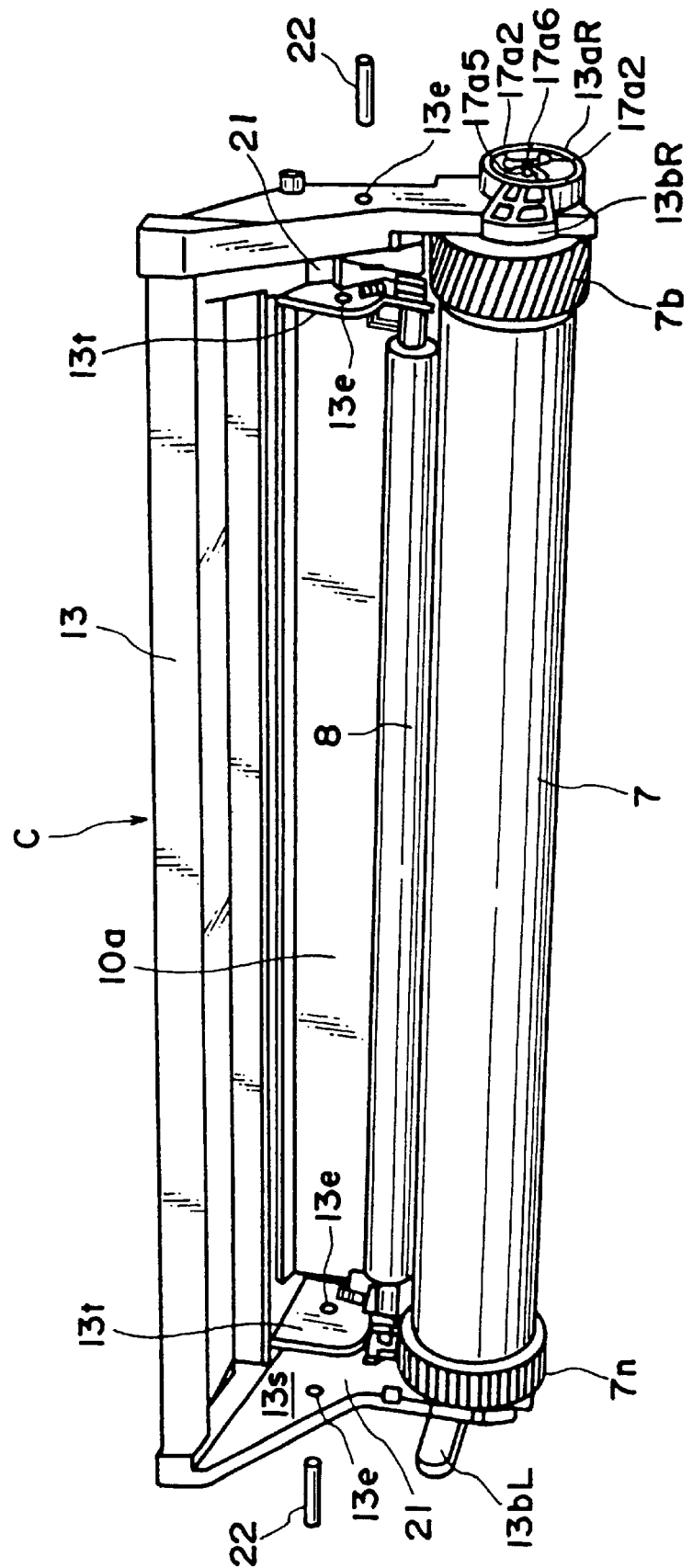
FIG. 12 is a perspective view of a cleaning unit.

Then, the aforementioned image developing unit D and cleaning unit C are joined with the use of a joining member 22, in a mutually pivotable manner, to complete the process cartridge B. More specifically, referring to FIG. 13, both lengthwise (axial direction of the developing roller 9c) ends of the image developing chamber frame 12 are provided with an arm portion 19, which is provided with a round hole 20 which is in parallel to the developing roller 9c. On the other hand, a recessed portion 21 for accommodating the arm portion 19 is provided at each lengthwise end of the cleaning chamber frame (FIG. 12). The arm portion 19 is inserted in this recessed portion 21, and the joining member 22 is pressed into the mounting hole 13e of the cleaning chamber frame 13, put through the hole 20 of the end portion of the arm portion 19, and pressed, farther, into the hole 13e of an partitioning wall 13t, so that the image developing unit D and the cleaning unit C are joined to be pivotable relative to each other about the joining member 22. In joining the image developing unit D and the cleaning unit C, a compression type coil spring 22a is placed between the two units, with one end of the coil spring being fitted around an unillustrated dowel erected from the base portion of the arm portion 19, and the other end being pressed against the top wall of the recessed portion 21 of the cleaning chamber frame 13. As a result, the image developing chamber frame 12 is pressed downward to reliably keep the developing roller 9c pressed downward toward the photosensitive drum 7. More specifically, referring to FIG. 13, a roller 9i having a diameter larger than that of the developing roller 9c is attached to each lengthwise end of the developing roller 9c, and this roller 9i is pressed on the photosensitive drum 7 to maintain a predetermined gap (approximately 300 µm) between the photosensitive drum 7 and the developing roller 9c. The top surface of the recessed portion 21 of the cleaning chamber frame 13 is slanted so that the compression type coil spring 22a is gradually compressed when the image developing unit D and the cleaning unit C are united. That is, the image developing unit D and the cleaning unit C are pivotable toward each other about the joining member 22, wherein the positional relationship (gap) between the peripheral surface of the photosensitive drum 7 and the peripheral surface of the developing roller 9c is precisely maintained by the elastic force of the compression type coil spring 22a.

Since the compression type coil spring 22a is attached to the base portion of the arm portion 19 of the image developing chamber frame 12, the elastic force of the compression type coil spring 22a affects only the base portion of the arm portion 19. In a case in which the image developing chamber frame 12 is provided with a dedicated spring mount for the compression type coil spring 22a, the adjacencies of the spring seat must be reinforced to precisely maintain the predetermined gap between the photosensitive drum 7 and the developing roller 9c. However, with the placement of the compression type coil spring 22a in the above described manner, it is unnecessary to reinforce the adjacencies of the spring seat, that is, the adjacencies of the base portion of the arm portion 19 in the case of this embodiment, because the base portion of the arm portion 19 is inherently greater in strength and rigidity.

The above described structure which holds together the cleaning chamber frame 13 and the image developing chamber frame 12 will be described later in more detail.

(Structure of Process Cartridge B Guiding Means)

Figure 9:
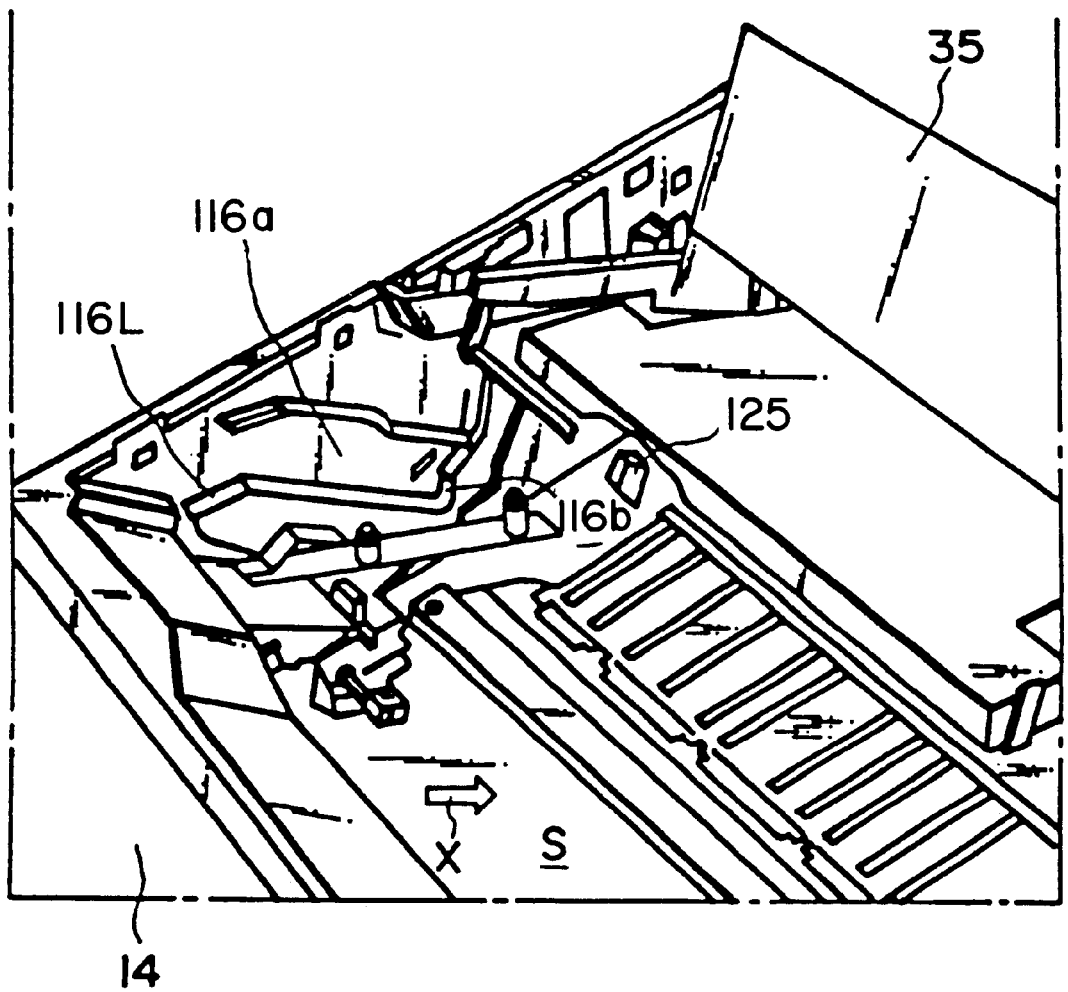
FIG. 9 is an external perspective view of the process cartridge accommodating portion of the main assembly of the apparatus illustrated in FIG. 1.
Figure 10:
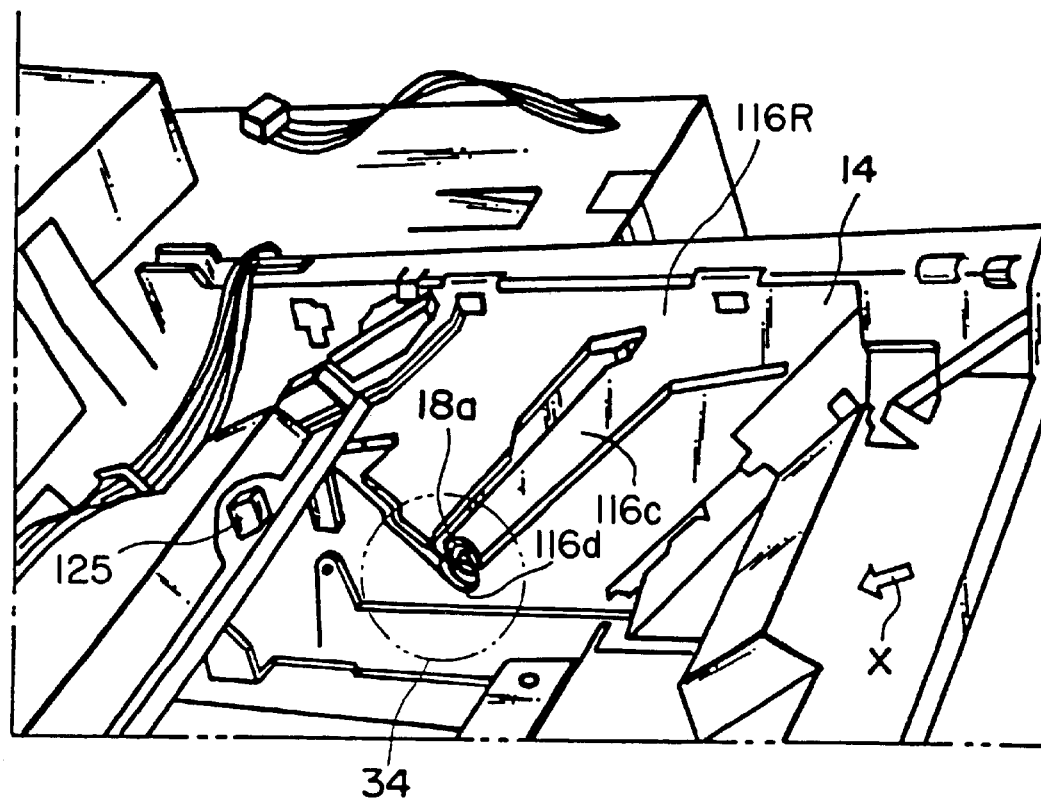
FIG. 10 is an external perspective view of the process cartridge accommodating portion of the main assembly of the apparatus illustrated in FIG. 1.

Next, the means for guiding the process cartridge B when the process cartridge B is installed into, or removed from, the main assembly 14 of an image forming apparatus will be described. This guiding means is illustrated in FIGS. 9 and 10. FIG. 9 is a perspective view of the left-hand side of the guiding means, as seen (in the direction of an arrow mark X) from the side from which the process cartridge B is installed into the main assembly 14 of the image forming apparatus A (as seen from the side of the image developing unit D side). FIG. 10 is a perspective view of the right-hand side of the same, as seen from the same side.

Referring to FIGS. 4, 5, 6 and 7, each lengthwise end of the cleaning frame portion 13 is provided with means which serves as a guide when the process cartridge B is installed into, or removed from, the apparatus main assembly 14. This guiding means is constituted of a cylindrical guides 13aR and 13aL as a cartridge positioning guiding member, and rotation controlling guides 13bR and 13bL as means for controlling the attitude of the process cartridge B when the process cartridge B is installed or removed.

As illustrated in FIG. 5, the cylindrical guide 13aR is a hollow cylindrical member. The rotation controlling guides 13bR is integrally formed together with the cylindrical guide 13aR, and radially protrudes from the peripheral surface of the cylindrical guide 13aR. The cylindrical guide 13aR is provided with a mounting flange 13aR1 which is also integral with the cylindrical guide 13aR. Thus, the cylindrical guide 13aR, the rotation controlling guide 13bR, and the mounting flange 13aR1 constitute the right-hand side guiding member 13R, which is fixed to the cleaning chamber frame 13 with small screws 13aR2 put through the screw holes of the mounting flange 13aR1. With the right-hand side guiding member 13R being fixed to the cleaning chamber frame 13, the rotation controlling guide 13bR extends over the lateral wall of the developing means gear holder 40 fixed to the image developing chamber frame 12.

Figure 11:
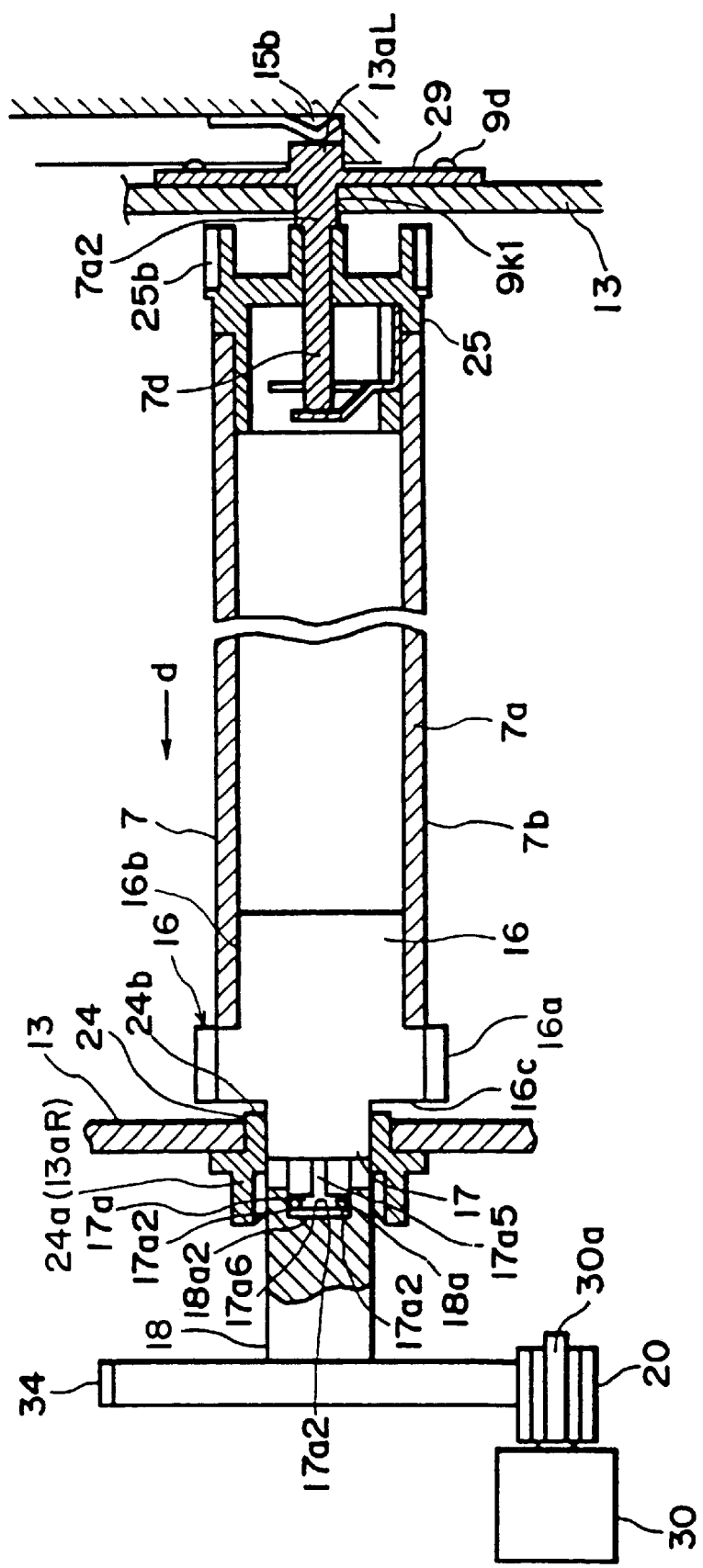
FIG. 11 is a vertical section of a photosensitive drum and a driving mechanism for driving the photosensitive drum.

Referring to FIG. 11, a drum shaft member is constituted of a drum shaft portion 7a inclusive of a larger diameter portion 7a2, a disk-shaped flange portion 29 and a cylindrical guide portion 13aL. The larger diameter portion 7a2 is fitted in the hole 13k1 of the cleaning frame portion 13. The flange portion 29 is engaged with a positioning pin 13c projecting from the side wall of the lengthwise end wall of the cleaning frame portion 13, being prevented from rotating, and is fixed to the cleaning frame portion 13 with the use of small screws 13d. The cylindrical guide 13aL projects outward (toward front, that is, the direction perpendicular to the page of FIG. 6). The aforementioned stationary drum shaft 7a which rotatively supports a spur gear 7n fitted around the photosensitive drum 7 projects inwardly from the flange 29 (FIG. 11). The cylindrical guide 13aL and the drum shaft 7a are coaxial. The flange 29, the cylindrical guide 13aL, and the drum shaft 7a, are integrally formed of metallic material such as steel.

Referring to FIG. 6, there is a rotation controlling guide 13bL slightly away from the cylindrical guide 13aL. It is long and narrow, extending substantially in the radial direction of the cylindrical guide 13aL and also projecting outward from the cleaning chamber frame 13. It is integrally formed with the cleaning chamber frame 13. In order to accommodate this rotation controlling guide 13bL, the flange 29 is provided with a cutaway portion. The distance the rotation controlling guide 13bL projects outward is such that its end surface is substantially even with the end surface of the cylindrical guide 13aL. The rotation controlling guide 13bL extends over the side wall of the developing roller bearing box 9v fixed to the image developing chamber frame 12. As is evident from the above description, the left-hand side guiding member 13L is constituted of two separate pieces: the metallic cylindrical guide 13aL and the rotation controlling guide 13bL of synthetic resin.

Next, a regulatory contact portion 13j, which is a part of the top surface of the cleaning chamber frame 13, will be described. In the following description of the regulatory contact portion 13j, "top surface" means the surface which faces upward when the process cartridge B is in the main assembly 14 of an image forming apparatus.

Referring to FIGS. 4–7, two portions 13j of the top surface 13i of the cleaning unit C, which are the portions right next to the right and left front corners 13p and 13q, relative to the direction perpendicular to the direction in which the process cartridge B is inserted, constitute the regulatory contact portions 13j, which regulate the position and attitude of the process cartridge B when the cartridge B is installed into the main assembly 14. In other words when the process cartridge B is installed into the main assembly 14, the regulatory contact portion 13j comes in contact with the fixed contact member 125 provided in the main assembly 14 of an image forming apparatus (FIGS. 9 and 10), and regulates the rotation of the process cartridge B about the cylindrical guide 13aR and 13aL.

Next, the guiding means on the main assembly side 14 will be described. Referring to FIG. 1, as the lid 35 of the main assembly 14 of an image forming apparatus is pivotally opened about a supporting point 35a in the counterclockwise direction, the top portion of the main assembly 14 is exposed, and the process cartridge accommodating portion appears as illustrated in FIGS. 9 and 10. The left and right internal walls of the image forming apparatus main assembly 14, relative to the direction in which the process cartridge B is inserted, are provided with guide members 116L (FIG. 9) and 116R (FIG. 10), respectively, which extend diagonally downward from the side opposite to the supporting point 35a.

As shown in the drawings, the guide members 116a and 116R comprise guide portions 16a and 16c, and positioning grooves 116b and 16d connected to the guide portions 116a and 116c, respectively. The guide portions 116a and 116c extend diagonally downward, as seen from the direction indicated by an arrow mark X, that is, the direction in which the process cartridge B is inserted. The positioning grooves 116b and 116d have a semicircular cross-section which perfectly matches the cross-section of the cylindrical guides 13aL or 13aR of the process cartridge B. After the process cartridge B is completely installed in the apparatus main assembly 14, the centers of semicircular cross-sections of the positioning groove 116b and 116d coincide with the axial lines of the cylindrical guides 13aL and 13aR, respectively, of the process cartridge B, and hence, with the axial line of the photosensitive drum 7.

The width of the guide portions 116a and 116c as seen from the direction in which the process cartridge B is installed or removed is wide enough to allow the cylindrical guides 13aL and 13aR to ride on them with a reasonable amount of play. Therefore, the rotation controlling guide 13bL and 13bR which are narrower than the diameter of the cylindrical guide 13aL and 13aR naturally fit more loosely in the guide portions 116a and 116c than the cylindrical guides 13aL and 13aR, respectively, yet their rotation is controlled by the guide portions 116a and 116c. In other words, when the process cartridge B is installed, the angle of the process cartridge B is kept within a predetermined range. After the process cartridge B is installed in the image forming apparatus main assembly 14, the cylindrical guides 13aL and 13aR of the process cartridge B are in engagement with the positioning grooves 116b and 116d of the guiding members 116L and 116R, and the left and right regulatory contact portions 13j located at the front portion, relative to the cartridge inserting direction, of the cleaning chamber frame 13 of the process cartridge B, are in contact with the fixed positioning members 125, respectively.

The weight distribution of the process cartridge B is such that when the line which coincides with the axial lines of the cylindrical guide 13aL and 13aR is level, the image developing unit D side of the process cartridge B generates a larger moment about this line than the cleaning unit C side.

The process cartridge B is installed into the image forming apparatus main assembly 14 in the following manner. First, the cylindrical guides 13aL and 13aR of the process cartridge B are inserted into the guide portion 116a and 116c, respectively, of the cartridge accommodating portion in the image forming apparatus main assembly 14 by grasping the recessed portion 17 and ribbed portion 11c of the process cartridge B with one hand, and the rotation controlling guides 13bL and 13bR are also inserted into the guide portions 116a and 116c, tilting downward the front portion, relative to the inserting direction, of the process cartridge B. Then, the process cartridge B is inserted farther with the cylindrical guides 13aL and 13aR and the rotation controlling guides 13bL and 13bR of the process cartridge B following the guide portions 116a and 116c, respectively, until the cylindrical guides 13aL and 13aR reach the positioning grooves 116b and 116d of the image forming apparatus main assembly 14. Then, the cylindrical guides 13aL and 13aR become seated in the positioning grooves 116b and 116d, respectively, due to the weight of the process cartridge B itself; the cylindrical guides 13aL and 13aR of the process cartridge B are accurately positioned relative to the positioning grooves 116b and 116d. In this condition, the line which coincides with the axial lines of the cylindrical guides 13aL and 13aR also coincides with the axial line of the photosensitive drum 7, and therefore, the photosensitive drum 7 is reasonably accurately positioned relative to the image forming apparatus main assembly 14. It should be noted here that the final positioning of the photosensitive drum 7 relative to the image forming apparatus main assembly 14 occurs at the same time as the coupling between the two is completed.

Also in this condition, there is a slight gap between the stationary positioning member 125 of the image forming apparatus main assembly 14 and the regulatory contact portion 13j of the process cartridge B. At this point of time, the process cartridge B is released from the hand. Then, the process cartridge B rotates about the cylindrical guides 13aL and 13aR in the direction to lower the image developing unit D side and raise the cleaning unit C side until the regulatory contact portions 13j of the process cartridge B come in contact with the corresponding stationary positioning members 125. As a result, the process cartridge B is accurately positioned relative to the image forming apparatus main assembly 14. Thereafter, the lid 35 is closed by rotating it clockwise about the supporting point 35a.

In order to remove the process cartridge B from the apparatus main assembly 14, the above described steps are carried out in reverse. More specifically, first, the lid 35 of the apparatus main assembly 14 is opened, and the process cartridge B is pulled upward by grasping the aforementioned top and bottom ribbed portions 11c, that is, the handhold portions, of the process cartridge by hand. Then, the cylindrical guides 13aL and 13aR of the process cartridge B rotate in the positioning grooves 116b and 116d of the apparatus main assembly 14. As a result, the regulatory contact portions 13j of the process cartridge B separate from the corresponding stationary positioning member 125. Next, the process cartridge B is pulled more. Then, the cylindrical guides 13aL and 13aR come out of the positioning grooves 16b and 16d, and move into the guide portions 16a and 16c of the guiding members 16L and 16R, respectively, fixed to the apparatus main assembly 14. In this condition, the process cartridge B is pulled more. Then, the cylindrical guides 13aL and 13aR and the rotation controlling guides 13bL and 13bR of the process cartridge B slide diagonally upward through the guide portions 116a and 116c of the apparatus main assembly 14, with the angle of the process cartridge B being controlled so that the process cartridge B can be completely moved out of the apparatus main assembly 14 without making contact with the portions other than the guide portions 116a and 116c.

Referring to FIG. 12, the spur gear 7n is fitted around one of the lengthwise ends of the photosensitive drum 7, which is the end opposite to where the helical drum gear 7b is fitted. As the process cartridge B is inserted into the apparatus main assembly 14, the spur gear 7n meshes with a gear (unillustrated) coaxial with the image transferring roller 4 located in the apparatus main assembly, and transmits from the process cartridge B to the transferring roller 4 the driving force which rotates the transferring roller 4.

(Coupling Means Structure and Driving Force Transmission Mechanism)

Next, the mechanism which transmits driving force from the main assembly 14 of an image forming apparatus to a process cartridge B will be described.

Figure 14:
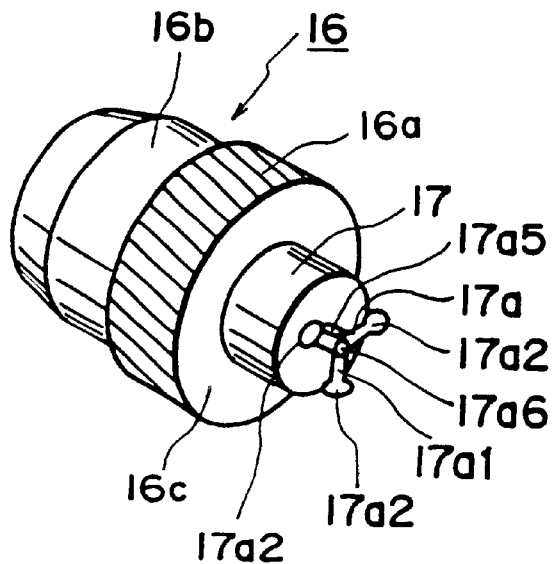
FIG. 14 is a perspective view of the drum flange (driving force transmitting component) in the first embodiment of the present invention.
Figure 15:
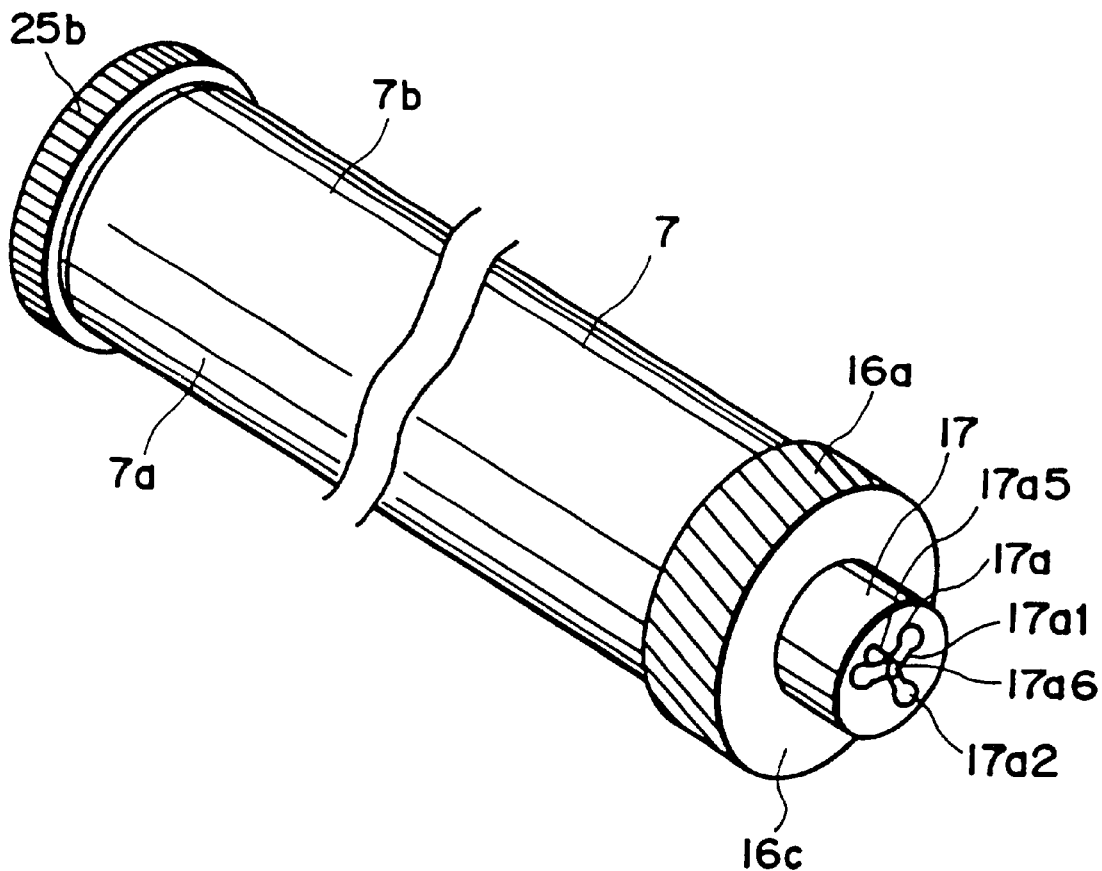
FIG. 15 is a perspective view of the photosensitive drum in the first embodiment of the present invention.
Figure 16:
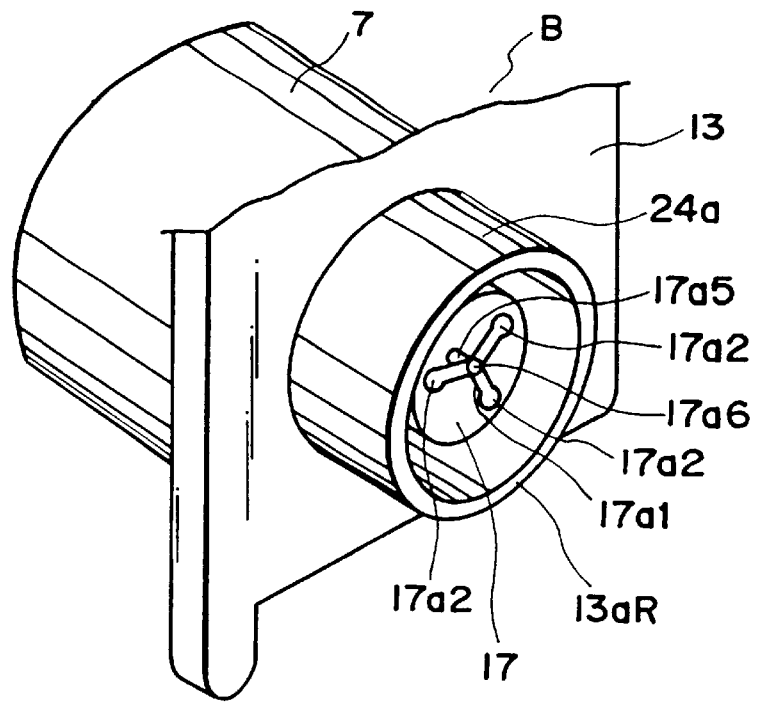
FIG. 16 is a perspective view of the coupling means portion on the process cartridge side in the first embodiment of the present invention.
Figure 17:
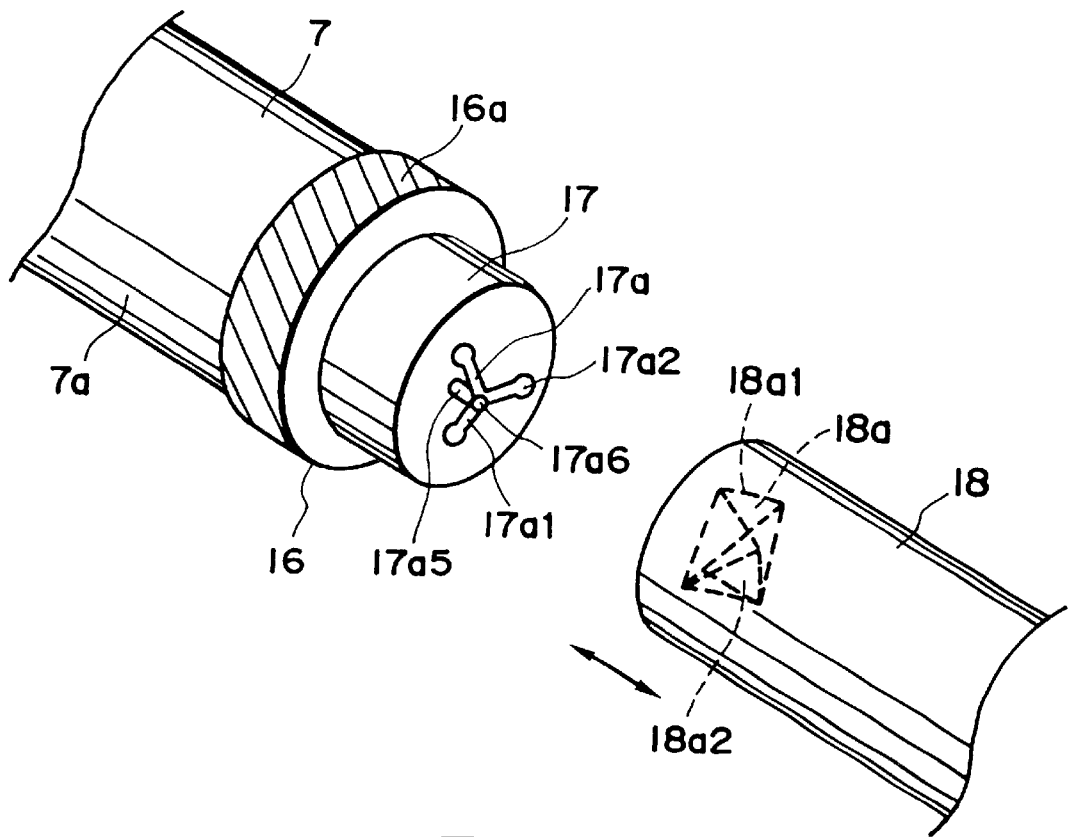
FIG. 17 is a perspective view of the coupling means in the first embodiment of the present invention.

FIG. 14 is a perspective view of a drum flange 16, as a driving force transmission component, which integrally comprises a male type coupler shaft 17. FIG. 15 is a partially broken perspective view of a photosensitive drum 7 fitted with the drum flange 16 illustrated in FIG. 14. FIG. 11 is a lengthwise section of the photosensitive drum 7 which has been fitted with the drum flange 16 and has been mounted in a process cartridge B. FIG. 16 is an enlarged perspective view of the portion of the process cartridge B illustrated in FIG. 11, adjacent to the male type coupler shaft 17. FIG. 17 is a perspective view of the coupling means comprising the male type coupler shaft 17 (on the process cartridge side) and a female type coupler shaft 18 (on the apparatus main assembly 14 side), depicting their relation.

Referring to FIGS. 11, and 15–17, one of the lengthwise ends of the photosensitive drum 7, mounted in the process cartridge B, is fitted with the cartridge side of the coupling means. This coupling means member is constituted of the male type coupler shaft 17 (cylindrical shaft) integral with the drum flange 16 fixed to the aforementioned end of the photosensitive drum 7. The end surface of the male type coupler shaft 17 is provided with a projection 17a as an actual coupling portion. The male type coupler shaft 17 fits in a bearing 24 fixed to a cleaning chamber frame 13, and serves as one of the rotational shafts of the photosensitive drum 7. In the first embodiment of the present invention, the drum flange 16, the male type coupler shaft 17, and the coupling projection 17 are integral. More specifically, they are integrally formed of plastic resin. Further, the drum flange 16 integrally comprises a helical gear 16a for transmitting driving force toga development roller 9c located in the process cartridge B. In other words, the drum flange 16 is a molded single piece component integrally comprising the helical gear 16a and the male type coupler shaft 17 with the coupling projection 17a, as illustrated in FIG. 14; it is a component which transmits the driving force.

Figure 24A:
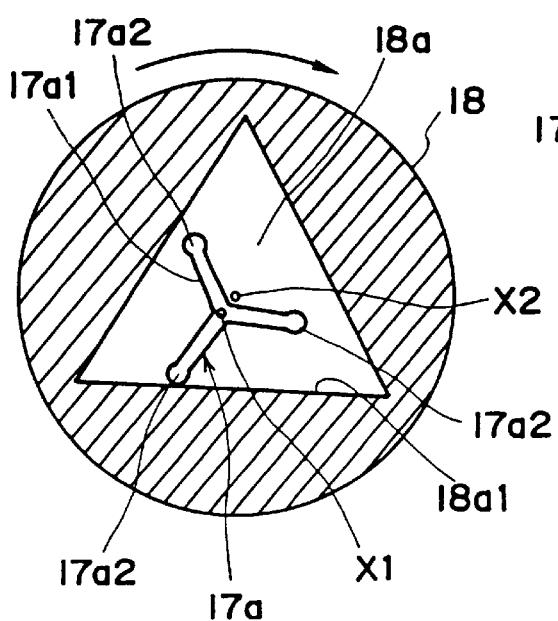
FIG. 24(a) is a cross section of the coupling projection and the coupling recess, before automatic alignment, and FIG. 24, (b) is a cross-section of the coupling projection and the coupling recess after automatic alignment.
Figure 24B:
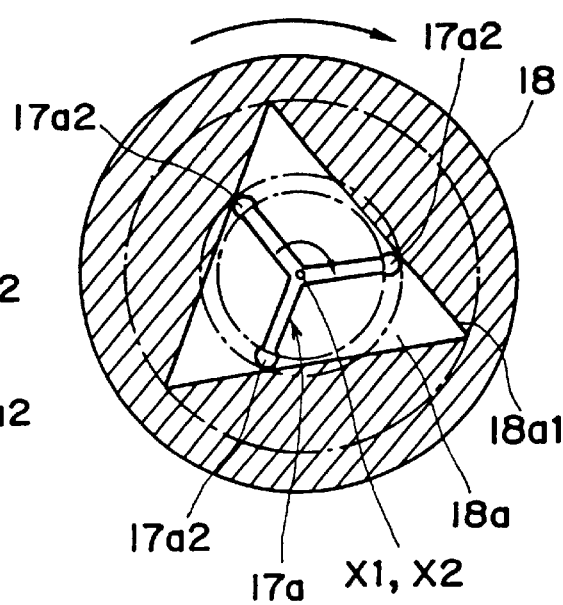

As for the configuration of the coupling projection 17a, the coupling projection 17a comprises a cylindrical support shaft 17a5, a plurality (three in this embodiment) of radial arms 17a1, and the same number of spherical contact portions 17a2. The support shaft 17a5 extends from the end surface of the male type coupler shaft 17, and its rotational axis is in alignment with the rotational axis of the shaft 17. The three radial arms 17a1 perpendicularly extend from the support shaft 17a5, and are separated by an angle of approximately 120 degrees. The three spherical contact portions 17a2 are located, one for one, at the end of the corresponding radial arm 17a1. A recess 18a which engages with the projection 17a is equilaterally triangular in cross section, and is twisted at a predetermined angle relative to its axial direction. The recess 18a rotates together with a large gear 34 (FIG. 18) on the apparatus main assembly 14 side. In this embodiment, as the process cartridge B is inserted in the apparatus main assembly 14, the projection 17a fits in the recess 18a on the apparatus main assembly 14 side, and the driving force is transmitted from the recess 18a to the projection 17a. As soon as the recess 18a begins to rotate, the plurality of the spherical portions 17a2 of the projection 17a come in contact with the correspondent inward surfaces 18a 1 of the excess 18a, the rotational axis of the projection 17a and the rotational axis of the recess 18a automatically align with each other (FIGS. 24, (a) and (b)). In FIGS. 24, (a) and (b), reference figures X1 and X2 designate the rotational axes of the projection 17a and recess 18a, respectively. Further, since the recess 18a is twisted relative to its axial direction, the contact between the recess 18a and the projection 17a generates, such force that works in the direction to cause the recess 18a to draw the projection 17 toward the recess 18a. Therefore, the spherical contact portions 17a2 slide on the corresponding inward surfaces of the recess 18a until the end surface 17a6 of the support shaft 17a5 comes in contact with the bottom surface 18a2 of the recess 18a. As a result, the position of the photosensitive drum 7 integral with the coupling projection 17a becomes fixed in the apparatus main assembly 14 in terms of the axial direction as well as the radial direction. Further, in this embodiment, the direction in which the recess 18a is twisted is opposite to the rotational direction of the photosensitive drum 7 as seen from the entrance of the recess 18a, looking into it, and the direction of the teeth of the helical gear 16a of the drum flange 16 is the same as the rotational direction of the drum flange 16 as seen from the center of the photosensitive drum 7 looking outward.

Regarding the contact between the male and female sides 17 and 18 of the coupling means, the theoretical number of contact points necessary to stabilize the contact is three as is in this embodiment in which the coupling projection 17a is provided with three spherical contact portions 17a 2 which are radially disposed at an angle of approximately 120 deg., and the cross section of the recess 18a is in the form of a substantially equilateral triangle. With such an arrangement, the spherical contact portions 17a2 of the projection 17a make equal contact with the corresponding internal surfaces 18a1 of the recess 18a with the substantially equilaterally triangular cross section, and therefore, the loosening of the contact between the male and female sides of the coupling means, and the irregular rotation of the photosensitive drum 7 which might be caused by loosening, can be minimized; the rotational accuracy of the photosensitive drum 7 is improved.

As described before, the male type coupler shaft 17 and the coupling projection 17a are integral parts of the drum flange 16, and their positional relationship relative to the main structure of the drum flange 16 is such that their axes become aligned with the axis of the photosensitive drum 7 as the drum flange 16 is attached to one of the lengthwise ends of the photosensitive drum 7. A reference FIG. 16b designates an engagement section, which comes in contact with the inward surface of the drum cylinder 7a as the drum flange 16 is attached to the photosensitive drum 7. As for the means for attaching the drum flange 16 to the photosensitive drum 7, crimping, gluing, or the like is used. The peripheral surface of the drum cylinder 7a is coated with a photosensitive layer 7b (FIGS. 11 and 15).

The other end of the photosensitive drum 7 is fixedly fitted with a drum flange 25 comprising a spur gear 25b integrally molded with the drum flange 25 (FIG. 11). The drum flange 25 is rotatively fitted around a drum shaft 7d integral with a flange 29 fixed to the cleaning means frame 12c.

As the process cartridge B is installed in the apparatus main assembly 14, a cylindrical guide 13aL, the axial line of which coincides with that of the rotational axis with the drum shaft 7d, engages with a U-shaped groove 116b (FIG. 9) of the apparatus main assembly 14, being thereby positionally fixed relative thereto, and the spur gear 25b integrally molded with the drum flange 25 meshes with an unillustrated gear which transmits driving force to a transfer roller 4.

The cleaning chamber frame 13 is provided with a cylindrical hollow boss 24a, which is coaxial with the male type coupler shaft 17 on the process cartridge B side, and fits around the coupling projection 17a of the male type coupler shaft 17 (FIGS. 4 and 11). This boss 24a protects the coupling projection 17a when the process cartridge B is installed or removed, or in the like occasion; it prevents the loosening and the resultant vibration which are liable to be caused by the damage of the projection, when the engaged coupling means is rotated.

As for the material for the drum flanges 16 and 25, resin material, for example, polyacetal, polycarbonate, polyamide, polybutylene-terephthalate, or the like is desirable, but material other than the listed may be employed as needed.

The boss 24a may double as a cylindrical guide 13aR which guides the process cartridge B when the process cartridge B is inserted into, or removed from, the apparatus main assembly 14. More specifically, when the process cartridge B is inserted into the apparatus main assembly 14, the boss 24a (guide 13aR) and the guide portion 116c on the apparatus main assembly side come in contact with each other to play the role of guide, facilitating the installation or removal of the process cartridge B relative to the apparatus main assembly 14. At the final stage of the installation of the process cartridge B, the boss 24a (guide 13aR) fits into the U-shaped groove 116d located at the deepest end of the guide portion 116c to fix the position of the process cartridge B relative to the apparatus main assembly 14. As the male type coupler shaft 17 is rotated by the driving force from the female type coupler shaft 18, they are aligned with each other, causing the guide 13aR (boss 24a) to be slightly (approximately 0.3 mm–1.0 mm) lifted from the bottom of the U-shaped groove 116d. Further, the gap between the guide 13aR (boss 24a) and the bottom portion of the guide portion 116a (recess portion 116d) on the apparatus main assembly side is smaller than the gap between the coupling projection 17a and the coupling recess 18a in the axial direction. Therefore, the coupling projection 17a and the coupling recess 18a can engage with each other when the process cartridge B is in the apparatus main assembly 14. At the deepest end of the U-shaped groove 116d, the coupling recess 18a integral with the large gear 34 is located. As for the configuration of the boss 24a, it does not need to be limited to the cylindrical shape such as the one in this embodiment. It may be any shape as long as it allows the boss 24a to be guided by the guide portion 16c and also be supported in the U-shaped groove 116d. For example, it does not need to be completely circular; it may be in the form of an arc. Further, in this embodiment, the bearing 24 which rotatively supports the male type coupler shaft 17, and the cylindrical boss 24a, are integrally molded, and are attached to the cleaning chamber frame 13 with unillustrated screws (FIG. 11). However, the bearing 24 and the boss 24a may be separate components.

Further, in this embodiment, the drum flange 25 is fitted around the drum shaft 7a attached to the cleaning chamber frame 13 (FIG. 11), and the male type coupler shaft 17 is fitted in the bearing 24 attached to the cleaning chamber frame 13; the photosensitive drum 7 is indirectly attached to the cleaning chamber frame 13. Thus, the photosensitive drum 7 rotates about the male type coupler shaft 17 and the drum shaft 7d. Also in this embodiment, the photosensitive drum 7 is attached to the cleaning chamber frame 13 so that it is allowed to move in the thrust direction. This arrangement is made in consideration of assembly error. However, this is not a requisite arrangement; it does not matter even if the photosensitive drum 7 is not allowed to move in the axial direction.

Figure 18:
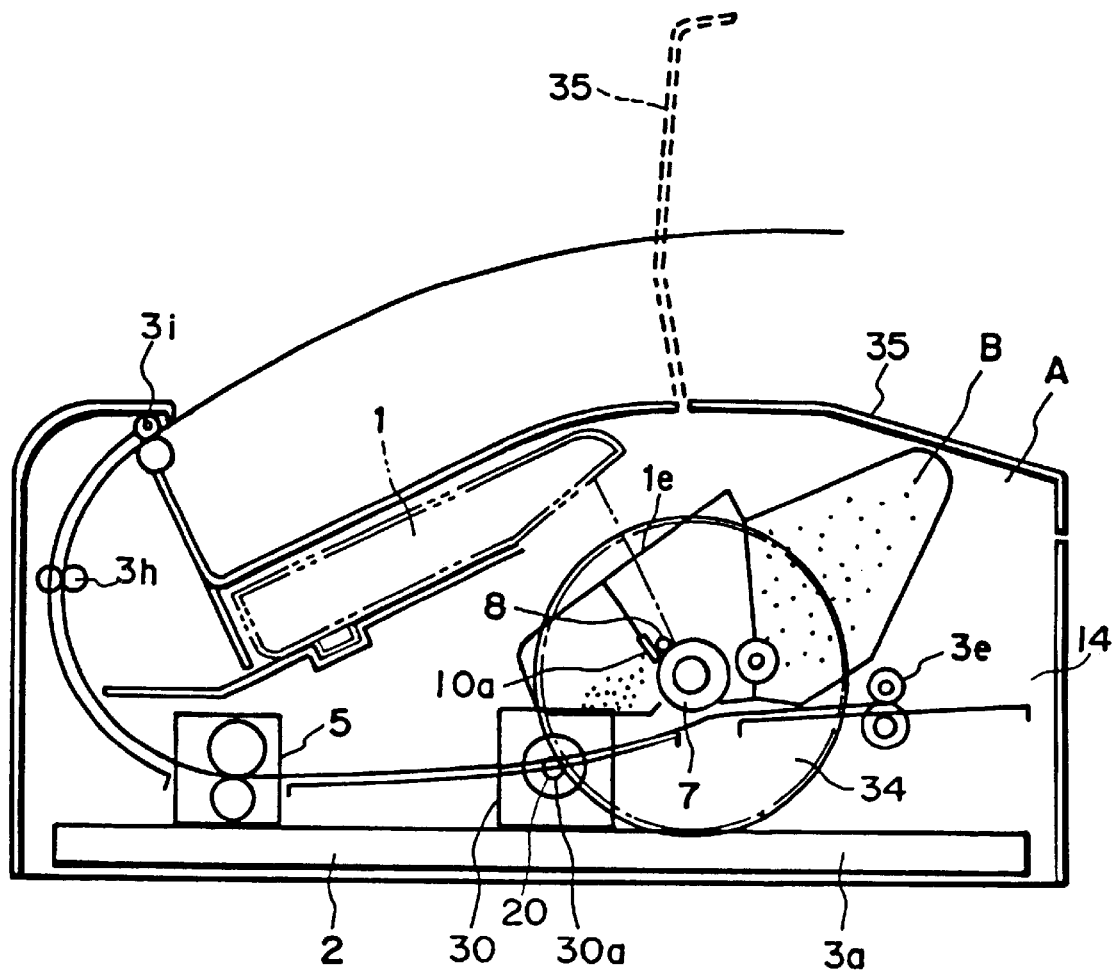
FIG. 18 is a side elevation of the driving system of the apparatus main assembly of the electrophotographic image forming apparatus in an embodiment of the present invention.

On the other hand, the apparatus main assembly 14 is provided with the female side of the coupling means, that is, the female type coupler shaft 18 (in the form of a cylinder), the axial line of which coincides with the rotational axis of the photosensitive drum 7 when the process cartridge B is in the apparatus main assembly 14 (FIGS. 11, 19 and 20). Referring to FIG. 18, the female type coupler shaft 18 is integral with the large gear 34 which transmits the driving force of a motor 30 to the photosensitive drum 7. It extends through the center of the large gear 34 in both the inward and outward directions (FIGS. 19 and 20). In this embodiment, the large gear 34 and the female type coupler shaft 18 are integrally formed of plastic.

The large gear 34 on the apparatus main assembly 14 side is a helical gear, and has helical teeth angled so that as the driving force is transmitted to the large gear 34 from a small helical gear 20 fixed to the shaft 30a of the motor 30 illustrated in FIG. 18, thrust is generated in the direction to move the female type coupler shaft 18 toward the male type coupler shaft 17. With this arrangement, as the motor 30 is driven for image formation, the aforementioned thrust moves the female type coupler shaft 18 toward the male type coupler shaft 17, helping the coupling recess 18*a* and the coupling projection 17*a* engage with each other. The coupling recess 18*a* is located at the inward end of the female type coupler shaft 18, and the rotational center of the coupling recess 18*a* coincides with that of the female type coupler shaft 18.

Although, in this embodiment, the driving force is directly transmitted to the large gear 34 from the small gear 20 fixed to the motor shaft 30*a*, the driving force may be transmitted through a gear train capable of reducing driving speed; the female type coupler shaft 18 may be rotatively driven with the use of a combination of a belt and pulleys, a pair of frictional rollers, a timing belt and pulleys, or the like.

Figure 21:
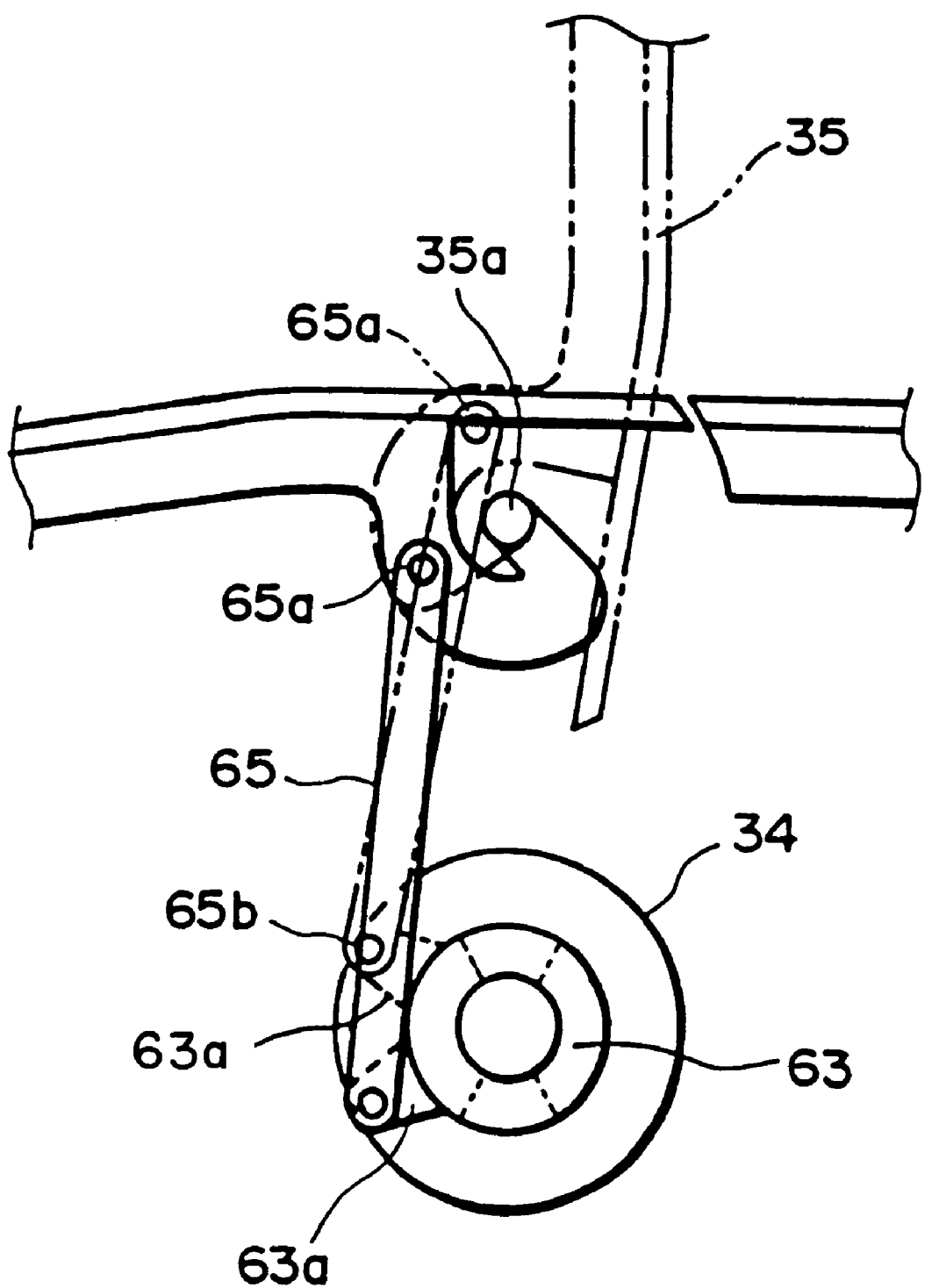
FIG. 21 is a vertical section of the structure of the linkage which connects the main assembly cover of an image forming apparatus and the coupling means.
Figure 22:
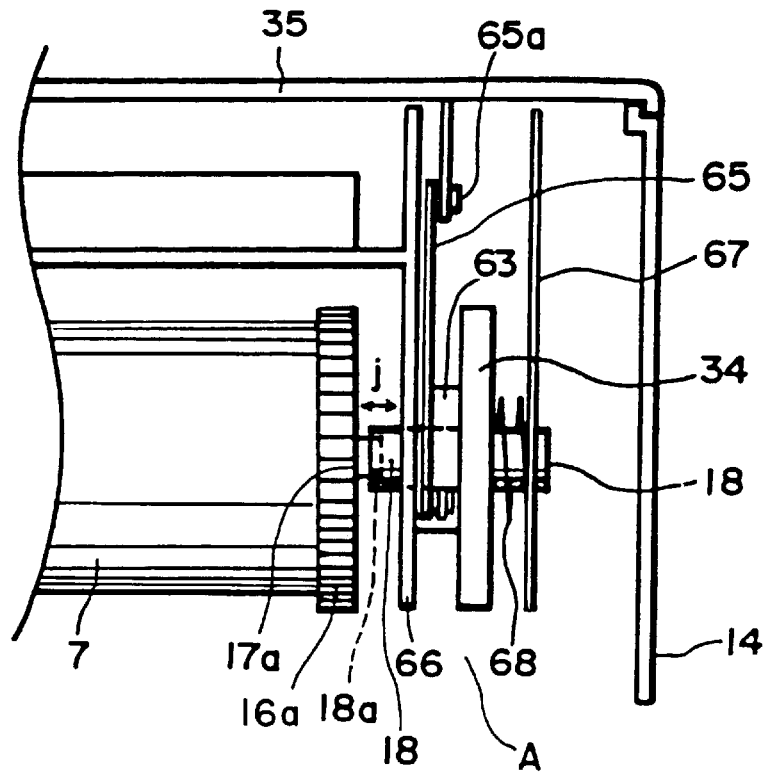
FIG. 22 is a side view of the female type coupler shaft portion on the apparatus main assembly side, and its adjacencies, while the process cartridge is being driven, in an embodiment of the present invention.
Figure 23:
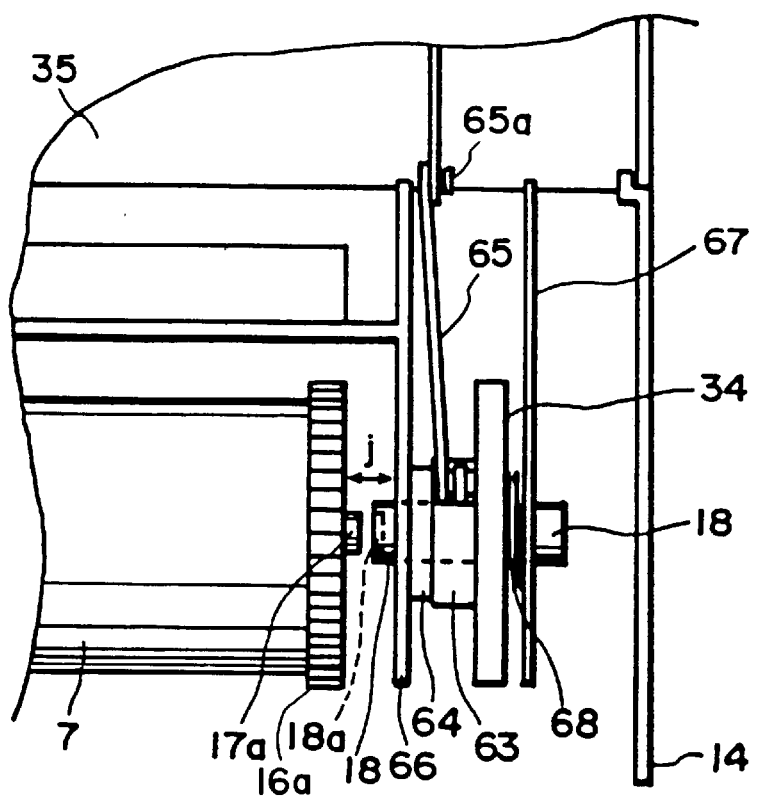
FIG. 23 is a side view of the female type coupler shaft portion on the apparatus main assembly side, and its adjacencies, in which the female coupler shaft portion has been disconnected.

Referring to FIG. 21 to FIG. 23, the description will be made as to a structure for engaging the recess 18*a* and the projection 17*a* in interrelation with the closing operation of the openable cover 35.

As shown in FIG. 23, the large gear 34 is between the side plate 67 and the side plate 66 in the main assembly 14, and the female coupling shaft 18*b* coaxially integral with the large gear 34 is rotatably supported by the side plates 66, 67. An outer cam 63 and an inner cam 64 are closely inserted between the large gear 34 and the side plate 66. The inner cam 64 is fixed to the side plate 66, and the outer cam 63 is rotatably engaged with the female coupling shaft 18. The surfaces of the outer cam 63 and the inner cam 64 which are substantially perpendicular to the axial direction and which are faced to each other, are cam surfaces, and are screw surfaces coaxial with the female coupling shaft 18 and are contacted to each other. Between the large gear 34 and the side plate 67, a compression coil spring 68 is compressed and fitted around the female coupling shaft 18.

As shown in FIG. 21, an arm 63*a* is extended from an outer periphery of the outer cam 63 in a radial direction, and an end of the arm 63*a* is coupled with an end of a link 65 by a pin 65*b* at a position opposite from openable cover 35. The other end of the link 65 is coupled to the cover by a pin 65*a*.

FIG. 22 is a view as seen from the right in FIG. 21, and when the openable cover 35 is closed, the link 65, outer cam 63 and the like are at the positions shown in the figure, where the male coupling projection 17*a* and the recess 18*a* are engaged so that driving force can be transmitted from the large gear 34 to the photosensitive drum 7. When the openable cover 35 is opened, the pin 65*a* is rotated upward about the fulcrum 35*a*, so that arm 63*a* is pulled up through the link 65, and the outer cam 63 is rotated; thus, relative sliding motion is caused between the outer cam 63 and the inner cam 64 to move the large gear 34 away from the photosensitive drum 7. At this time, the large gear 34 is pushed by the outer cam 63, and is moved against the compression coil spring 68 mounted between the side plate 67 and the large gear 34, by which the female coupling recess 18*a* is disengaged from the male coupling projection 17*a* as shown in FIG. 23 to release the coupling to bring the process cartridge B into demountable state.

On the contrary, when the openable cover 35 is closed, the pin 65*a* connecting the link 65 with the openable cover 35, is rotated downward about the fulcrum 35*a*, and the link 65 is moved downward to push the arm 63*a* down, so that outer cam 63 is rotated in the opposite direction, by which the large gear 34 is moved to the left by the spring 68 to a position shown in FIG. 22, so that large gear 34 is set again at a position of FIG. 22, and the female coupling recess 18*a* is engaged with the male coupling projection 17*a* to re-establish a drive transmittable state. Thus, the demountable state and the drive transmittable state of the process cartridge B are established in response to opening and closing of the openable cover 35. When the outer cam 63 is rotated in the opposite direction by the closing of the openable cover 35 to move the large gear 34 to the left from the position of FIG. 23, the female coupling shaft 18 and the end surface of the male coupling shaft 17 may be abutted to each other so that male coupling projection 17*a* and the female coupling recess 18*a* may not be engaged with each other. However, they will be brought into engagement as soon as starting of the image forming apparatus A, as will be described hereinafter.

Next, the functions of the coupling projection 17*a* and the coupling recess 18*a*, that is, the actual coupling members of the coupling means, will be described.

As described before, the female type coupler shaft 18 on the apparatus main assembly 14 side is enabled to move in the axial direction, but is supported so that it does not move in the radial direction. On the other hand, the process cartridge B is installed in the apparatus main assembly 14, being allowed to move in the lengthwise direction of the photosensitive drum 7 as well as in the radial direction of the photosensitive drum 7.

Thus, as the process cartridge B is installed in the apparatus main assembly 14, the cylindrical guide 13*a*L located on the axial line of the drum shaft 7*d* (FIG. 11) which fits in the center hole of the drum flange 25 attached to one end of the photosensitive drum 7 drops into the U-shaped groove 116*b* (FIG. 9), that is, the guide accommodating portion of the apparatus main assembly 14, and gaplessly engages therewith, being positionally fixed. Further, the spur gear 25*b* integrally formed with the drum flange 25 meshes with the unillustrated gear which transmits the driving force to the transfer roller 4. Meanwhile, on the other lengthwise end (driven side) of the photosensitive drum 7, the boss 24*a* of the cleaning chamber frame 13 is supported in the U-shaped groove 116*d*. Then, as the lid 35 is closed, the coupling recess 18*a* is horizontally moved, and fits around the coupling projection 17*a* (FIG. 22, and FIG. 24, (*a*)).

Next, the driving side of the coupling means operates as follows. As the lid 35 is closed, the female type coupler shaft 18 moves toward the male type coupler shaft 17. If the rotational phase of the coupling projection 17*a* coincides with that of the coupling recess 18*a*, the coupling recess 18*a* advances in the axial direction all the way to fit around the coupling projection 17*a*, and if not, the spherical contact portion 17*a*2 of the male type coupler shaft 17 makes contact with the brim portion of the coupling recess 18*a*, while being pushed by the elastic force of a compression type coil spring 68.

Then, as the rotation of the motor 30 on the apparatus main assembly 14 side synchronizes the rotational phases of the coupling recess 18*a* and coupling projection 17*a* (in this embodiment, their phases coincide every 120 deg.), the female type coupler shaft 18, which is under the electric pressure from the compression type coil spring 68, and is also being thrust by the rotation of the large gear 34, is allowed to move toward the male type coupler shaft 17 (in the direction indicated by an arrow mark d in FIG. 19), and engages with the male type coupler shaft 17. Thus, the rotational driving force is transmitted from the apparatus main assembly 14 to the process cartridge B (relationship between the female type coupler shaft 18 and the male type coupler shaft 17 changes from the state depicted in FIG. 23 to the state depicted in FIG. 22).

Referring to FIG. 24, (*a*), the coupling projection 17*a* and coupling recess 18*a* are different in size, that is, the substantially triangular cross section of the coupling recess 18a is larger than that of the coupling projection 17a, and therefore, when the coupling projection 17a and the coupling recess 18a are coupled with each other, the coupling projection 17a smoothly enters the coupling recess 18a, leaving a gap between them. As is evident from the above description, even after the process cartridge B has been installed in the cartridge space of the apparatus main assembly 14, the positional accuracy of the male type coupler shaft 17 and the female type coupler shaft 18 relative to each other may be rough as long as an image forming apparatus is not in an image forming operation.

Also in this embodiment, the distance the cylindrical boss 24a projects is rendered larger than the distance the coupling projection 17a projects (FIG. 11). Therefore, when the coupling projection 17a and the coupling recess 18a engage with each other, the inward surface of the cylindrical boss 24a comes in contact with the peripheral surface of the female type coupler shaft 18, functioning as a guide which facilitates the engagement between the two shafts 17 and 18.

During an image forming operation, as the female type coupler shaft 18 rotates, with the coupling projection 17a in the coupling recess 18a, the inward surface 18a1 of the coupling recess 18a and the spherical contact portion 17a2 of the coupling projection 17a come in contact with each other, as illustrated in FIG. 24, (b), and as a result, the driving force is transmitted. At this time, the male type coupler shaft 17 instantly shifts so that the plurality of the inward surfaces 18a1 of the coupling recess 18a evenly contact the plurality of the corresponding spherical contact portions 17a2 of the coupling projection 17a (positional relation between the coupling projection 17a and the coupling recess 18a changes from the state illustrated in FIG. 24, (a) to the state illustrated in FIG. 24, (b)). Since the triangle formed by the lines connecting adjacent spherical contact portions 17a2, and the cross section of the coupling recess 18a, are both substantially equilateral triangle, and therefore, the contact pressure between one of the spherical contact portions 17a2 and the corresponding inward surface 18a1 of the coupling recess 18a becomes substantially equal to the contact pressure between the other spherical contact portions 17a2 and the corresponding inward surfaces 18a1 of the coupling recess 18a. As a result, the rotational axes of the male type coupler shaft 17 and the female type coupler shaft 18 are automatically aligned. In other words, even when the coupling projection 17a is in the coupling recess 18a, the rotational axis X1 of the coupling projection 17a and the rotational axis X2 of the coupling recess 18a are out of alignment relative to each other as long as the male type coupler shaft 17 is not rotated by the female type coupler shaft 18 (FIG. 24, (a)). However, as soon as the female type coupler shaft 18 begins to rotate, the three spherical contact portions 17a2 of the coupling projection 17a and the corresponding inward surfaces 18a1 of the coupling recess 18a come in contact with each other, and as a result, the rotational axes X1 and X2 become aligned with each other in practical terms.

With the provision of the above-described structure, while the motor 30 rotates, the rotational axes of the male type coupler shaft 17 and the female type coupler shaft 18 are automatically aligned in practical terms. Further, as the driving force is transmitted to the photosensitive drum 7, moment is generated in the process cartridge B, and due to this moment, the rotation control surface 13j provided on the top surface of the cleaning chamber frame 13 of the process cartridge B (FIGS. 4 and 7) comes in contact with the rotation control projection 125 (FIGS. 9 and 10) fixed to the apparatus main assembly 14. As a result, the position of the process cartridge B relative to the apparatus main assembly 14 is fixed.

When not driven (while images are not formed), a gap is created between the surfaces of the coupling projection 17a and the coupling recess 18a in the radial direction of the coupler shafts 17 and 18. As a result, it becomes easier for the coupler shafts 17 and 18 to be disengaged from each other, or for the process cartridge B to be installed into, or removed from, the apparatus main assembly 14. When driven, the interface between the two shafts 17 and 18 of the coupling means is stabilized, and therefore, the loosening or resultant vibrations, which might occur at the interface between the two coupler shafts 17 and 18 can be prevented.

Further, in this embodiment, the cross section of the coupling recess 18a is substantially equilaterally triangular, but this is not a requisite. Obviously, the cross section of the coupling recess may be of any polygonal shape, for example, as long as the coupling projection is provided with a plurality of contact points, the number of which matches the number of the inward walls of the coupling recess.

Further, in comparison with the coupling recess, the coupling projection is more liable to be damaged, and is inferior in strength, due to its shape. Therefore, in this embodiment, the coupling projection is placed on the process cartridge B side which is replaceable, and the coupling recess is placed on the apparatus main assembly 14 side which is required to be significantly more durable.

The essential features of the process cartridge B descried in the preceding embodiments can be summarized as follows. The process cartridge B is removably installable in the main assembly 14 of an electrophotographic image forming apparatus A which forms images on a recording medium 2, and comprises: the motor 30; the large gear 34 which transmits the driving force from the motor 30; and the coupling recess 18a which is polygonal in cross section and rotates with the large gear 34. The process cartridge B comprises: the electrophotographic photosensitive drum 7; processing means (charge roller 8, development roller 9c, and cleaning blade 10a) which acts on the electrophotographic photosensitive drum 7; and the coupling projection 17a which engages with the coupling recess 18a, the surface of the coupling projection 17a coming in contact with the inward surface of the coupling recess 18a, wherein as the process cartridge B is installed in the apparatus main assembly 14, and the large gear 34 on the apparatus main assembly 14 side rotates, the coupling projection 17a being fitted in the coupling recess 18a, the rotational force is transmitted from the large gear 34 on the apparatus main assembly 14 side to the photosensitive drum 7 while generating thrust in the direction to cause the coupling projection 17a to be drawn into the coupling recess 18a.

The coupling projection 17a is located at the inward facing surface of the innermost end of male type coupler shaft 17. The male type coupler shaft 17 extends outward from one of the lengthwise ends of the photosensitive drum 7, and its rotational axis coincides with that of the photosensitive drum 7. Further, the male type coupler shaft 17 rotatively supports the photosensitive drum 7 on the cleaning chamber frame 13.

The male type coupler shaft 17 projects outward from the center of the outward side surface of the helical gear 16a. From the opposite side surface, that is, the inward side surface, of the helical gear 16a, the engagement portion 16b, which comes in contact with the inward surface of the photosensitive drum 7, projects. In other words, the coupling projection 17a, the male type coupler shaft 17, the helical gear 16a, and the engagement portion 16b are integral with each other and are formed of resin. The helical gear 16a transmits driving force to the development roller 9c as the aforementioned processing means.

The process cartridge B also comprises the cylindrical boss 24a which surrounds the coupling projection 17a, and serves as a guide which guides the coupling recess 18a and the coupling projection 17a as they move relative to each other to become engaged.

The specification of the large gear 34 on the apparatus main assembly 14 side is desired to be in the following range: approximately 0.4–0.7 in elastic modulus; approximately 30 mm–150 mm in diameter at the base of a tooth; and approximately 40 teeth to 400 teeth in tooth count. The numerical values in the specifications for any given large gear may be optionally selected from these ranges in consideration of the space available in the apparatus main assembly 14, and desired image quality. Further, these ranges are not requisite. For the sake of information, the large gear 34 in this embodiment is approximately 0.5 in elastic modulus; approximately 100 mm in diameter at the tooth base; and 200 in tooth count.

The positioning of the process cartridge B relative to the apparatus main assembly 14, which occurs in an image forming operation (when driving force is transmitted), can be summarized as follows.

First, when not in an image forming operation (while driving force is not transmitted), the position of the process cartridge B is fixed as the cylindrical guide 13aL perfectly fits in the U-shaped groove 116b. At this time, the boss 24a is simply supported in the U-shaped groove 116d as a receiver. When in an image forming operation (while driving force is transmitted), the position of the process cartridge B is fixed as the coupling projection 17a on the process cartridge B is drawn deeper into the coupling recess 18a on the apparatus main assembly 14 side, and the end surface of the coupling projection 17a comes in contact with the bottom surface of the coupling recess 18a. In other words, when in an image forming operation, the position of the process cartridge B is fixed as the position of one of the lengthwise ends of the photosensitive drum 7 is fixed by the U-shaped groove 116b, and the position of the other end of the process cartridge B is fixed by the automatic axial alignment effect caused between the coupling projection 17a and coupling recess 18a by the rotation of the female type coupler shaft 18. In the first embodiment of the present invention, the photosensitive drum 7 is rendered movable (approximately 0.1 mm–1.0 mm) in the lengthwise direction thereof in consideration of assembly error. Therefore, as the coupling projection 17a is drawn into the coupling recess 18a, the outward surface 16c (FIGS. 11, 14 and 15) of the drum flange 16 comes in contact with the inward brim of the bearing 24. Also in consideration of assembly error, the process cartridge B is rendered movable (approximately 0.1 mm–3.0 mm) relative to the side plate (installation guides 116a and 116c). Therefore, as the driving force is transmitted, the process cartridge B is drawn in the lengthwise as well as radial directions of the photosensitive drum 7 (moved substantially in the diagonally upward direction). It should be noted here that when the inward surface 16c of the drum flange 16 is already in contact with the inward brim 24b of the bearing 24 before the transmission of the driving force begins, or when the photosensitive drum 7 is given substantially no play in the axial direction, the process cartridge B is drawn in the lengthwise and radial directions of the photosensitive drum 7 (moved substantially in the diagonally upward direction) as soon as the driving force is transmitted. Further, when the photosensitive drum 7 is given some play in the lengthwise direction, it is possible to fix the position of the photosensitive drum 7 by causing the outermost end 17a6 of the coupling projection 17a to come in contact with the bottom surface 18a2 of the coupling recess 18a.

When in an image forming operation, moment is generated in the direction to rotate the process cartridge B in the rotational direction of the photosensitive drum 7, and the process cartridge B is rotated by this moment in the rotational direction of the photosensitive drum 7 until the rotation control surface 13j of the process cartridge B comes in contact with the rotation control projection 125 fixed to the apparatus main assembly 14.

Thus, when in an image forming operation, the position of the process cartridge B is fixed relative to the apparatus main assembly 14 in the lengthwise as well as radial direction of the photosensitive drum 7.

Embodiment 2

Next, referring to FIG. 25, the second embodiment of the present invention will be described regarding the configuration of the coupling projection 17a of the male type coupler shaft 17. Since the basic structures of the process cartridge B and the image forming apparatus A in this embodiment are the same as those described in the first embodiment, the portions which are the same in function as those in the first embodiment are designated with the same referential figures, so that the description in the first embodiment can be borrowed.

Figure 25:
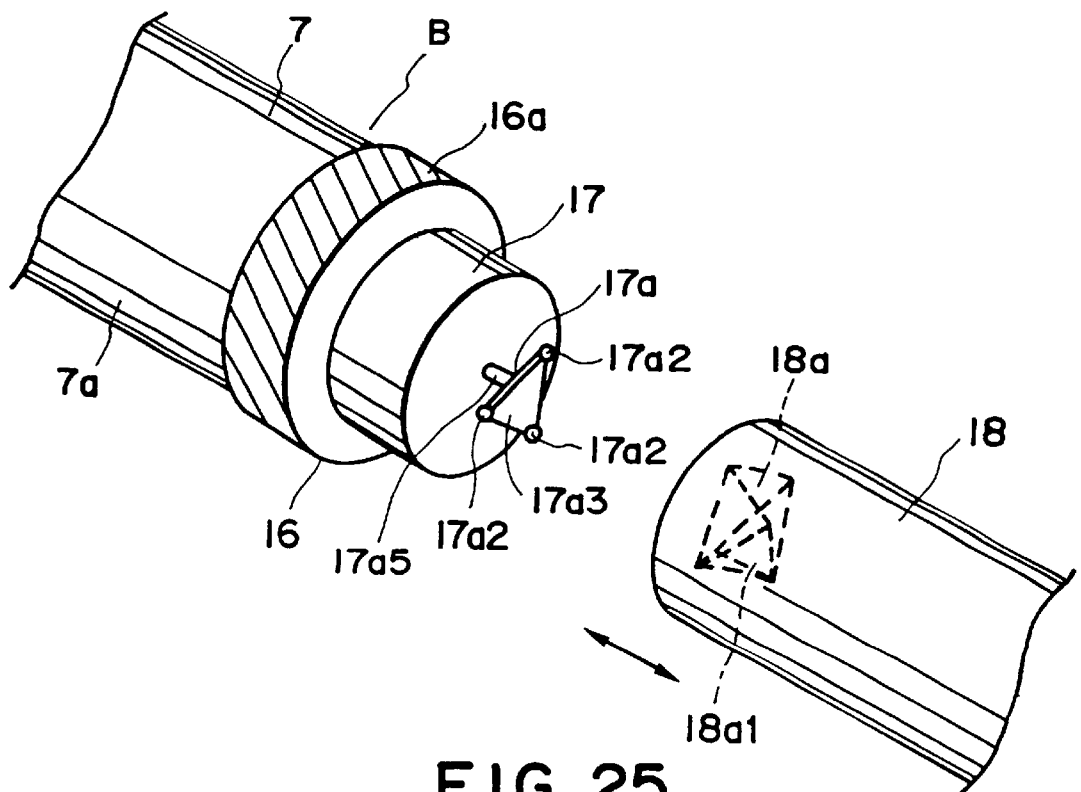
FIG. 25 is a perspective view of the coupling means in the second embodiment of the present invention.

The coupling projection 17a illustrated FIG. 25 is different from its counterpart in the first embodiment in that the coupling projection 17a in this embodiment is constituted of a cylindrical support shaft 17a5 extending from the center of the end surface of the male type coupler shaft 17, and a substantially triangular plate 17a3 attached to the end of the cylindrical support shaft 17a5 so that the three apexes of the triangular plate 17a3 have an equal distance from the rotational axis of the male type coupler shaft 17. Further, in order to allow the triangular plate 17a3 to easily slide on the inward surface 18a1 of the coupling recess 18a, the apexes are each give a spherical contact surface 17a2; the apexes may be rounded or given an arc shape. The triangular plate 17a3 is integrally formed with the cylindrical support shaft 17a5, or is formed separately from the shaft 17a5 and is fixed thereto. As for the cylindrical support shaft 17a5, its rotational axis also coincides with the rotational axis of the male type coupler shaft 17, and is integrally formed with the male type coupler shaft 17, or is individually formed and firmly attached to the center of the male type coupler shaft 17. The diameter of the support shaft 17a5 may be large enough for the peripheral surface thereof to reach the edges of the triangular plate 17a3, or it may be small so that the peripheral surface of the support shaft 17a5 does not reach the edges of the triangular plate 17a3 as in this embodiment. It should be noted here that the support shaft 17a5 may be a shaft with an equilaterally triangular cross section, other than being a cylindrical shaft, as long as the contour of the cross section thereof is within the contour of the triangular plate 17a3.

With the provision of the above described structure, the same effects as described in the first embodiment can be obtained.

Embodiment 3

Next, referring to FIG. 26, the third embodiment of the present invention will be described regarding the configuration of the coupling projection 17a of the male type coupler shaft 17. Since the basic structures of the process cartridge B and the image forming apparatus A in this embodiment are the same as those described in the second embodiment, the portions which are the same in function as those in the second embodiment are designated with the same referential figures, so that the description in the second embodiment can be borrowed.

Figure 26:
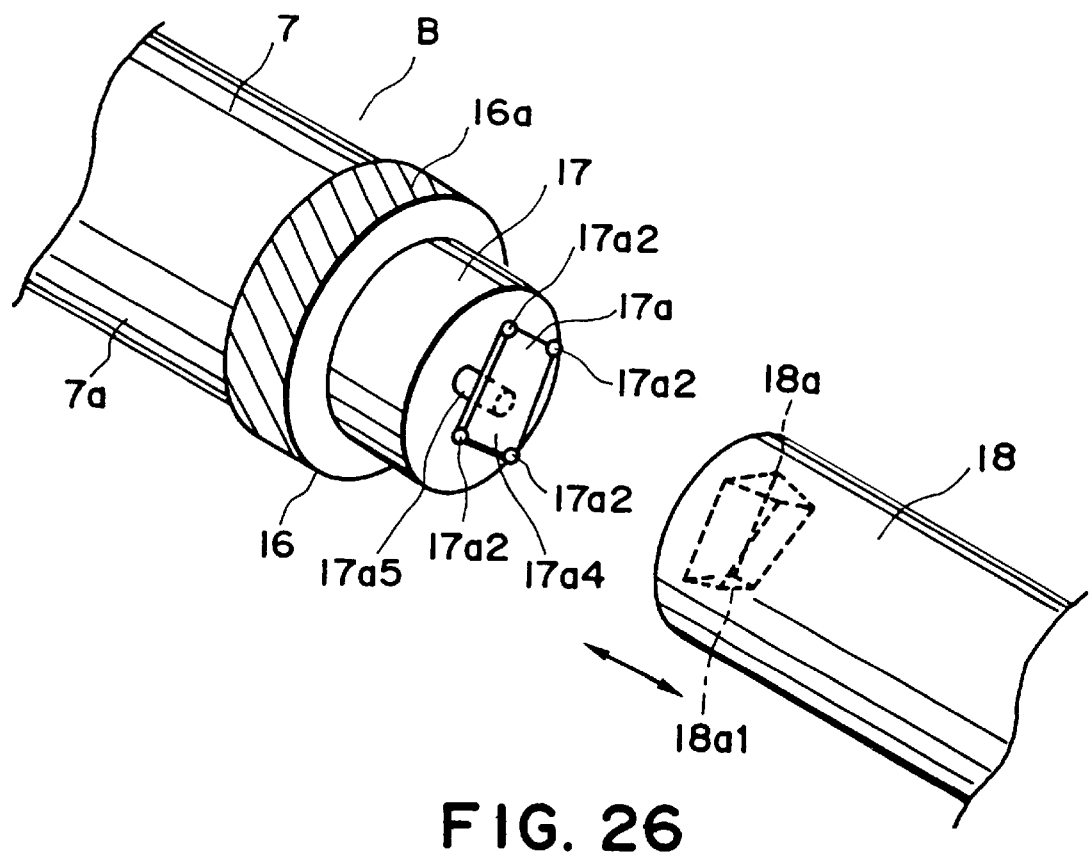
FIG. 26 is a perspective view of the coupling means in the third embodiment of the present invention.

The coupling projection 17a of the male type coupler shaft 17 and the coupling recess 18a of the female type coupler shaft 18 illustrated FIG. 26 are different from their counterparts in the second embodiment in that the coupling recess 18a in this embodiment is substantially square in cross section, and is twisted relative to the axial direction, and the coupling projection 17a is constituted of a support shaft 17a5, and a substantially square plate 17a4 attached to the end of the support shaft 17a5. The four apexes of the square plate 17a4 are 90 deg. apart from the adjacent apexes, and have an equal distance from the rotational axis of the male type coupler shaft 17. Further, the four apexes are each given a spherical contact surface 17a2 which makes contact with one of the inward surfaces 18a1 of the coupling recess 18a. The support shaft 17a5 may be a cylindrical shaft, a square shaft, or the like as long as the contour of the cross section thereof is within the contour of the square plate 17a4.

With the provision of the above structure, the same effects as those described in the second embodiment can be obtained. The desirable number of contacts between the coupling projection 17a and the coupling recess 18a, that is, the number of the apexes on the male type coupler shaft 17 side or the number of the contact surfaces on the female type coupler shaft 18a side, is three because three apexes never fail to make contact with their corresponding contact surfaces. However, the number may be four or more provided that the contact points can be accurately set.

Embodiment 4

Figure 27:
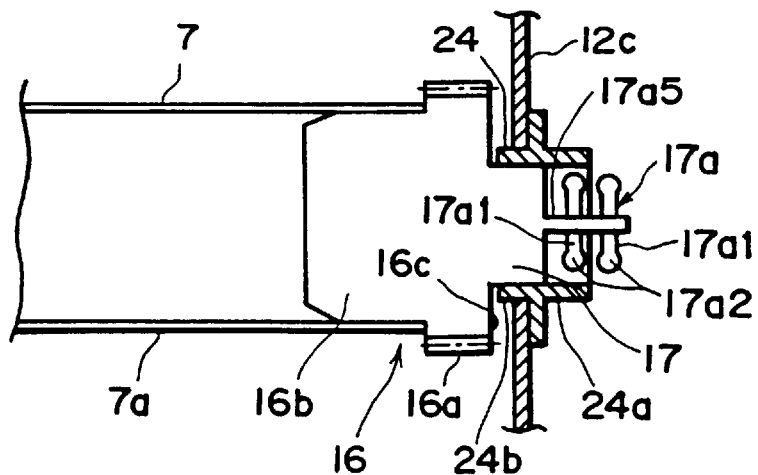
FIG. 27 is a lengthwise section of the coupling means in the fourth embodiment of the present invention.

This fourth embodiment is substantially the same as the preceding embodiments, except that the coupling projection 17a is provided with two sets of spherical contact portions 17a2. Referring to FIG. 27, the two sets are located at different points on the axial line of the male type coupler shaft 17. Each spherical contact portion 17a2 of each set is attached to the end of one of the radial arms 17a1 attached to the support shaft 17a5 perpendicularly to the axial direction, as it is in the first embodiment. Two sets are rendered different in rotational phase so that each spherical contact portion 17a2 of both sets accurately makes contact with one of the twisted surfaces of the twisted coupling recess 18a of the female type coupler shaft 18. It should be noted here that also in this embodiment, each spherical contact portion 17a2 may be disposed at one of the apexes of a triangular plate as it is disposed at one of the apexes of the triangular plate 17a3 in the second embodiment, or at one of the apexes of a square plate as it is disposed at one of the apexes of the square plate 17a4 in the third embodiment.

According to this fourth embodiment, the coupling recess 18a and the coupling projection 17a make contact with each other in such a manner that each of the inward surfaces of the coupling recess 18a makes contact with two spherical contact portions 17a2. Therefore, this embodiment is effective to increase the durability of the spherical contact portions 17a2.

Miscellaneous Embodiments

In the preceding embodiments, the spherical contact portions 17a2 are placed on a single plane perpendicular to the axial direction of the coupling means. However, each spherical contact portion 17a2 may be located at a point different, in terms of the axial direction, from the point at which any other spherical contact point is located.

Next, regarding the above described coupling projection 17a, additional practical embodiments thereof will be described.

Figures 28, 29, 30:
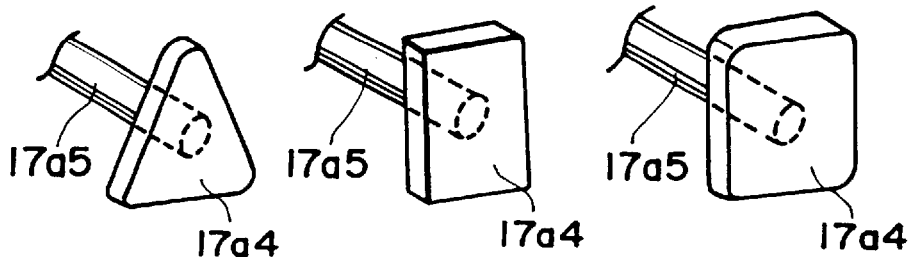
FIG. 28 is a perspective view of the end portion of the male side of the coupling means in another embodiment of the present invention.
FIG. 29 is a perspective view of the end portion of the male side of the coupling means in another embodiment of the present invention.
FIG. 30 is a perspective view of the end portion of the male side of the coupling means in another embodiments of the present invention.

Referring to FIG. 28, instead of being left angular, the apexes of a triangular plate are chamfered round. In this embodiment, the coupling portion 17a4 is in the form of a plate, and therefore, it is stronger.

FIG. 29 shows a square plate which is given sharp corners, and FIG. 30 shows a square plate, the corners of which have been chamfered.

Both the plates illustrated in FIGS. 29 and 30 may be employed as the coupling portion 17a.

Figure 31:
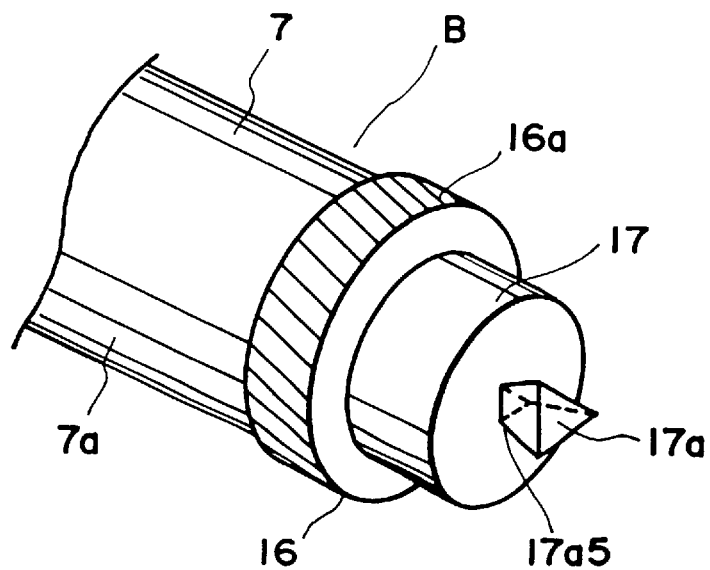
FIG. 31 is a perspective view of the male type coupler shaft on the process cartridge side in another embodiment of the present invention.

FIG. 31 depicts another embodiment of the coupling portion in accordance with the present invention, in which the coupling portion 17a is in the form of an inverted truncated trigonal pyramid; the cross section of the coupling portion 17a in the form of an inverted truncated trigonal pyramid, perpendicular to the axial direction of the coupling means, becomes gradually smaller from the main assembly side end, which comes in contact with the inward walls of the coupling recess, toward the photosensitive drum side ends, that is, the base end. In this case, substantially the entire coupling portion 17a, except for the three corners as the contact point, constitutes the support shaft 17a5.

In each of the preceding embodiments, the contact points, that is, the apexes of the plates or the truncated trigonal pyramid, on the male type coupler shaft 17 side are supported by a support portion, wherein the diameter of the circle passing through the intersections, between any plane perpendicular to the axial line of the coupling means, and the edges of the support portion, is smaller than the diameter of the locus of any contact point, or any apex, of the coupling portion 17a, which comes in contact with one of the inward surfaces of the coupling recess 18a, that is, the diameter of the circle passing through the apexes of the square plate, the apexes of the triangular plate, or the apexes of the triangular end surface of the truncated trigonal pyramid.

In the preceding description of the present invention, the direction in which the coupling recess 18a, or the coupling projection 17a is twisted is opposite to the rotational direction of the photosensitive drum as seen from the entrance of the coupling recess 18a, looking into it.

The ratio of the twist of the coupling recess 18a is 1 deg. to 15 deg. per 1.0 mm in the axial direction.

The depth of the coupling recess 18a is approximately 4.0 mm, and the angle of the overall twist is approximately 30 deg.

The process cartridge in each of the preceding embodiments in such a process cartridge that is detachably mountable to the main assembly of an electrophotographic image forming apparatus, wherein the main assembly includes: a motor; a main assembly side gear for receiving driving force from the motor; a hole defined by twisted surfaces, the hole being substantially coaxial with the gear; the process cartridge includes: an electrophotographic photosensitive drum; process means actable on the photosensitive drum; and a projection being provided at a longitudinal end of the photosensitive drum, wherein the projection includes contact portions which come in contact with the twisted surfaces, and a support portion which supports the contact portions, and can be drawn into the hole, and wherein when the main assembly side gear rotates with the hole, and the contact portion of the projection engages with the hole, rotational driving force is transmitted from the gear to the photosensitive drum through the engagement between the hole and the projection, and force is generated in the direction to draw the projection into the hole.

As described above, according to the preceding embodiments, the rotational accuracy of an electrophotographic photosensitive drum is improved due to automatic aligning effects. Further, the coupling means member on the electrophotographic photosensitive drum is drawn into the coupling means member on the apparatus main assembly side along the axial line of the coupling means, and therefore, the position of the electrophotographic photosensitive drum is accurately fixed in terms of the axial direction, in addition to the radial direction.

Each of the contact points of the coupling projection of one of the coupling means members, which come in contact with one of the inward surfaces of the twisted recess of the other member of the coupling means, which couples with the first coupling means member, is given a three dimensional curvature. Therefore, the coupling projection smoothly slides on the inward surfaces of the twisted coupling recess, making it easier for the coupling means to engage or disengage. Consequently, the durability of the coupling projection increases.

Giving the contact point a spherical surface makes it easier to manufacture the coupling means members, and also makes it possible to improve the dimensional accuracy of the coupling means members.

When the contact point with a curved surface is located at the end of a radial arm, the arm absorbs the shock which occurs when the contact point comes in contact with one of the inward surfaces of the coupling recess. Therefore, the durability of the coupling projection improves.

When the contact point with the curved surface is constituted of the chamfered corner of a polygonal plate, the support portion of the contact point is strong. Therefore, it is easier to handle a process cartridge.

Locating all the contact points with the curved surface on a single plane substantially perpendicular to the axial line of the photosensitive drum makes it easier to manufacture the coupling means.

Disposing all the contact points with the curved surfaces so that their distances from the axial line of the photosensitive drum becomes the same, and separating the adjacent contact points from each other by the same angle, make it easier to control the dimension of the coupling means during manufacture thereof.

When each contact point with the curved surface is disposed at a different location, in terms of the axial direction of the photosensitive drum, from the locations at which the other contact points with the curved surface are disposed, and also is located a different distance from the other contact points relative to the axial direction of the electrophotographic photosensitive drum, the angle one of the coupling means members must rotate before one of the contact portions with the curved surface comes in contact with one of the inward surfaces of the coupling recess becomes smaller. Therefore, the coupling means completely engages much faster.

Further, when the coupling means member on the electrophotographic photosensitive drum side is provided with a plural sets of contact points, being arranged in tiers in the axial direction of the electrophotographic photosensitive drum, the durability of the coupling means improves, and therefore, the rotational accuracy of the electrophotographic photosensitive drum can be maintained much longer.

In this embodiment, the process cartridge B was described as a process cartridge which forms a monochromatic image, but the present invention is applicable, with desirable effects, to a process cartridge which comprises a plurality of developing means for forming an image composed of a plurality of colors (for example, two toner image, three tone images, full color image, or the like).

The electrophotographic photosensitive member does not need to be limited to the photosensitive drum 7. For example, the following types may be included. First, as for the photosensitive material, photoconductive material such as amorphous silicon, amorphous selenium, zinc oxide, titanium oxide, organic photoconductor, and the like, may be included. As for the configuration of the base member on which photosensitive material is placed, it may be in the form of a drum or belt. For example, the drum type photosensitive member comprises a cylinder formed of aluminum alloy or the like, and a photoconductor layer deposited or coated on the cylinder.

As for the image developing method, various known methods may be employed; for example, two-component magnetic brush type developing method, cascade type developing method, touch-down type developing method, cloud type developing method, and the like.

Also in this embodiment, a so-called contact type charging method was employed, but obviously, charging means with a structure different from the one described in this embodiment may be employed; for example, one of the conventional structures, in which a tungsten wire is surrounded by a metallic shield formed of aluminum or the like, on three sides, and positive or negative ions generated by applying high voltage to the tungsten wire are transferred onto the surface of a photosensitive drum to uniformly charge the surface of the photosensitive drum.

The charging means may in the form of a blade (charge blade), a pad, a block, a rod, a wire, or the like, in addition to being in the form of a roller.

As for the method for cleaning the toner remaining on the photosensitive drum, a blade, a fur brush, a magnetic brush, or the like may be employed as a structural member for the cleaning means.

As described in the foregoing, the rotational accuracy of the photosensitive drum can be improved.

While the invention has been described with reference to the structures disclosed herein, it is not confined to the details set forth and this application is intended to cover such modifications or changes as may come within the purposes of the improvements or the scope of the following claims.

What is claimed is:

1. A process cartridge detachably mountable to a main assembly of an electrophotographic image forming apparatus, wherein said main assembly includes a motor, a driving rotatable member for receiving driving force from said motor, and a hole defined by twisted surfaces, said hole being substantially coaxial with said driving rotatable member, said process cartridge comprising:

an electrophotographic photosensitive drum;

process means actable on said photosensitive drum; and a projection provided at a longitudinal end of said photosensitive drum, wherein said projection has an engaging portion for engagement with the twisted surfaces and a supporting portion for supporting said engaging portion, and said supporting portion is capable of entering said hole, and wherein when said driving rotatable member rotates with said hole and said engaging portion of said projection engaged with each other, rotational driving force is transmitted from said driving rotatable member to said photosensitive drum through engagement between said hole and said projection, and said projection is urged inwardly of said hole.

2. A process cartridge according to claim 1, wherein a position of said projection relative to said hole is determined with rotation of said hole with said projection being in said hole.

3. A process cartridge according to claim 1 or 2, wherein said hole and said projection are axially aligned with rotation of said hole with said projection being in said hole.

4. A process cartridge according to claim 1, 2 or 3, wherein a position of said projection relative to an inner side of said hole is regulated by contact therebetween at three points.

5. A process cartridge according to claim 1 or 2, wherein said projection is driven by engagement of said inner side of said hole and said engaging portion.

6. A process cartridge according to claim 1, wherein said engaging portion contacts an inner side of said hole at three dimensional curved surfaces.

7. A process cartridge according to claim 6, wherein said curved surfaces are defined by free ends of arms extended substantially from a center of said electrophotographic photosensitive drum, and said arms are supported on said supporting portion.

8. A process cartridge according to claim 6 or 7, wherein said curved surfaces are defined by free ends of arms extended substantially from a center of said electrophotographic photosensitive drum, and said arms are supported on said supporting portion.

9. A process cartridge according to claim 6 or 7, wherein said curved surfaces are defined at corners of a flat polygonal plate.

10. A process cartridge according to claim 6 or 7, wherein said curved surfaces are in a plane substantially perpendicular to an axis of said projection.

11. A process cartridge according to claim 10, wherein a plurality of such curved surfaces are provided at positions substantially equidistant from a center of said photosensitive drum.

12. A process cartridge according to claim 10, wherein a plurality of such curved surfaces are provided at substantially circumferentially equidistant positions of a circle having a center concentric with the axis of said photosensitive drum.

13. A process cartridge according to claim 6, wherein a plurality of such curved surfaces are provided at different positions in a longitudinal direction of said photosensitive drum.

14. A process cartridge according to claim 13, wherein a plurality of such curved surfaces are provided at different distances from the center of said photosensitive drum.

15. A process cartridge according to claim 1, wherein said projection has a plurality of second projections for substantially point contact with inside surfaces of said hole in a plurality of planes substantially perpendicular to an axis of said photosensitive drum provided at different positions in a longitudinal direction of said photosensitive drum.

16. A process cartridge according to claim 1, wherein said engaging portion includes arms radially extended at circumferentially equidistant positions from a center of said photosensitive drum, wherein said arms are supported by said supporting portion, and said arms have spherical free ends.

17. A process cartridge according to claim 1, wherein said engaging portion is in the form of a flat plate which is supported by said supporting portion.

18. A process cartridge according to claim 17, wherein said flat plate has spherical corners.

19. A process cartridge according to claim 17, wherein said flat plate has chamfered corners.

20. A process cartridge according to claim 16, 17, 18 or 19, wherein said engaging portion is provided at each of plural positions which are different in the longitudinal direction of said photosensitive drum.

21. A process cartridge according to claim 1, wherein said process means includes at least one of charging means, developing means and cleaning means, as a unit.

22. A process cartridge detachably mountable to a main assembly of an electrophotographic image forming apparatus for forming an image on a recording material, said main assembly including a motor, a driving rotatable member for receiving driving force from said motor, and a twisted recess having a non-circular cross section and being substantially coaxial with a rotation axis of said driving rotatable member, said process cartridge comprising:

a rotatable electrophotographic photosensitive drum;

process means actable on said photosensitive drum; and a projection provided at a longitudinal end of said photosensitive drum, said projection having an engaging portion for engagement with an inner surface of the twisted recess and a supporting portion for supporting said engaging portion, said supporting portion being capable of entering said recess, and said engaging portion having a non-circular cross section and being substantially coaxial with a rotation axis of said photosensitive drum, wherein said projection of said photosensitive drum has such a dimension and configuration that it can take a first relative rotational position with respect to said recess of said driving rotatable member in which relative rotational movement therebetween is permitted, and a second relative rotational position with respect to said recess of said driving rotatable member in which relative rotational movement is prevented in one rotational direction, while the rotation axis of said driving rotatable member and the rotation axis of said photosensitive drum are substantially aligned, and said projection is urged inwardly of said recess by rotation of said recess.

23. A process cartridge according to claim 22, wherein said recess of said driving rotatable member and said projection of said photosensitive drum are contacted substantially at three twisted lines.

24. A process cartridge according to claim 22, wherein said recess and said projection are contacted substantially at three points that constitute a substantially equilateral triangle.

25. A process cartridge according to claim 22, wherein said engaging portion contacts an inner side of said recess at three dimensional curved surfaces.

26. A process cartridge according to claim 25, wherein said curved surfaces are spherical.

27. A process cartridge according to claim 25 or 26, wherein said curved surfaces are defined by free ends of arms extended substantially from a center of said electrophotographic photosensitive drum, and said arms are supported on said supporting portion.

28. A process cartridge according to claim 25 or 26, wherein said curved surfaces are defined at corners of flat polygonal plate.

29. A process cartridge according to claim 25 or 26, wherein said curved surfaces are in a plane substantially perpendicular to an axis of said projection.

30. A process cartridge according to claim 27, wherein a plurality of such curved surfaces are provided at positions substantially equidistant from a center of said photosensitive drum.

31. A process cartridge according to claim 30, wherein a plurality of such curved surfaces are provided at substantially circumferentially equidistant positions of a circle having a center concentric with the axis of said photosensitive drum.

32. A process cartridge according to claim 22, wherein a plurality of such curved surfaces are provided at different positions in a longitudinal direction of said photosensitive drum.

33. A process cartridge according to claim 32, wherein a plurality of such curved surfaces are provided at different distances from the center of said photosensitive drum.

34. A process cartridge according to claim 22, wherein said projection has a plurality of second projections for substantially point contact with inside surfaces of said recess in a plurality of planes substantially perpendicular to an axis of said photosensitive drum provided at different positions in a longitudinal direction of said photosensitive drum.

35. A process cartridge according to claim 22, wherein said projection includes arms radially extended at circumferentially equidistant positions from a center of said photosensitive drum.

36. A process cartridge according to claim 22, wherein said projection has an engaging portion in the form of a flat plate.

37. A process cartridge according to claim 36, wherein said flat plate has spherical corners.

38. A process cartridge according to claim 36, wherein said flat plate has chamfered corners.

39. A process cartridge according to claim 36, 37 or 38, wherein said engaging portion is provided at each of plural positions which are different in the longitudinal direction of said photosensitive drum.

40. A process cartridge according to claim 22, wherein said process means includes at least one of charging means, developing means and cleaning means, as a unit.

41. An electrophotographic image forming apparatus for forming an image on a recording material, to which a process cartridge is detachably mountable, said apparatus comprising:

(a) a motor;
(b) a driving rotatable member for receiving driving force from said motor;
(c) a hole defined by twisted surfaces, said hole being substantially coaxial with said driving rotatable member;
(d) a mounting member for detachably mounting the process cartridge, which includes:
an electrophotographic photosensitive drum,
process means actable on said photosensitive drum, and
a projection provided at a longitudinal end of said photosensitive drum, wherein said projection has an engaging portion for engagement with the twisted surfaces and a supporting portion for supporting said engaging portion, and said supporting portion is capable of entering said hole, and wherein when said driving rotatable member rotates with said hole and said engaging portion of said projection engaged with each other, rotational driving force is transmitted from said driving rotatable member to said photosensitive drum through engagement between said hole and said projection, and said projection is urged inwardly of said hole;
(e) moving means for imparting relative movement between said hole and said projection in a longitudinal direction of said photosensitive drum; and
(f) feeding means for feeding the recording material.

42. An electrophotographic image forming apparatus for forming an image on a recording material, to which a process cartridge is detachably mountable, said apparatus comprising:

(a) a motor;
(b) a driving rotatable member for receiving driving force from said motor;
(c) a recess defined by twisted surfaces, said recess being substantially coaxial with said driving rotatable member;
(d) a mounting member for mounting the process cartridge, which includes:
a rotatable electrophotographic photosensitive drum,
process means actable on said photosensitive drum, and
a projection provided at a longitudinal end of said photosensitive drum, said projection having an engaging portion for engagement with an inner surface of the twisted recess and a supporting portion for supporting said engaging portion, said supporting portion being capable of entering said recess, and said engaging portion having a non-circular cross section and being substantially coaxial with a rotation axis of said photosensitive drum, wherein said projection of said photosensitive drum has such a dimension and configuration that it can take a first relative rotational position with respect to said recess of said driving rotatable member in which relative rotational movement therebetween is permitted, and a second relative rotational position with respect to said recess of said driving rotatable member in which relative rotational movement is prevented in one rotational direction, while the rotation axis of said driving rotatable member and the rotation axis of said photosensitive drum are substantially aligned, and said projection is urged inwardly of said recess by rotation of said recess;
(e) moving means for imparting relative movement between said recess and said projection in a longitudinal direction of said photosensitive drum; and
(f) feeding means for feeding the recording material.

43. A process cartridge according to claim 1, wherein said supporting portion is reduced in shape.

44. A process cartridge according to claim 1 or 22, wherein said driving rotatable member is a gear.

45. A process cartridge according to claim 17, wherein said flat plate is triangular.

46. A process cartridge according to claim 45, wherein corners of said flat plate are chamfered.

47. A process cartridge according to claim 17, wherein said flat plate is rectangular.

48. A process cartridge according to claim 47, wherein corners of said flat plate are chamfered.

49. A process cartridge according to claim 35, wherein said arms are projected in three directions from a center of said photosensitive drum.

50. A process cartridge according to claim 36, wherein said flat plate is triangular.

51. A process cartridge according to claim 50, wherein corners of said flat plate are chamfered.

52. A process cartridge according to claim 36, wherein said flat plate is rectangular.

53. A process cartridge according to claim 52, wherein corners of said flat plate are chamfered.

54. A process cartridge according to claim 27, wherein said arms are projected in three directions from a center of said photosensitive drum.

55. An apparatus according to claim 41 or 42, wherein said driving rotatable member is a gear.

56. A process cartridge according to claim 22, wherein said engaging portion is provided at each of plural positions which are different in the longitudinal direction of said photosensitive drum.

57. A process cartridge detachably mountable to a main assembly of an electrophotographic image forming apparatus, wherein said main assembly includes a motor, a driving rotatable member for receiving driving force from said motor, and a hole defined by twisted surfaces, said hole being substantially coaxial with said driving rotatable member, said process cartridge comprising:

a cartridge frame;

an electrophotographic photosensitive drum;

process means actable on said photosensitive drum, said process means including a developing member for developing a latent image formed on said photosensitive drum, and a charging member for electrically charging said photosensitive drum;

a projection provided at a longitudinal end of said photosensitive drum, wherein said projection has an engaging portion for engagement with the twisted surfaces and a supporting portion for supporting said engaging portion, wherein said end of said photosensitive drum is provided with a shaft for supporting said photosensitive drum on said cartridge frame, and said engaging portion is supported on said shaft by said supporting portion, and a cross section of said supporting portion in a direction crossing with a longitudinal direction of said photosensitive drum is smaller than a cross section of said engaging portion, and said supporting portion is capable of entering said hole, and wherein when said driving rotatable member rotates with said hole and said engaging portion of said projection engaged with each other, rotational driving force is transmitted from said driving rotatable member to said photosensitive drum through engagement between said hole and said projection, wherein said engaging portion is contacted to said twisted surfaces at least three points.

58. A process cartridge detachably mountable to a main assembly of an electrophotographic image forming apparatus, wherein said main assembly includes a motor, a driving rotatable member for receiving driving force from said motor, and a hole defined by twisted surfaces, said hole being substantially coaxial with said driving rotatable member, said process cartridge comprising:

a cartridge frame;

an electrophotographic photosensitive drum;

process means actable on said photosensitive drum, said process means including a developing roller for developing a latent image formed on said photosensitive drum, and a charging member for electrically charging said photosensitive drum;

a projection provided at a longitudinal end of said photosensitive drum, wherein said projection has an engaging portion for engagement with the twisted surfaces and a supporting portion for supporting said engaging portion, wherein said end of said photosensitive drum is provided with a shaft for supporting said photosensitive drum on said cartridge frame, and said engaging portion is supported on said shaft by said supporting portion, and a cross section of said supporting portion in a direction crossing with a longitudinal direction of said photosensitive drum is smaller than a cross section of said engaging portion, and said supporting portion is capable of entering said hole, and wherein when said driving rotatable member rotates with said hole and said engaging portion of said projection engaged with each other, rotational driving force is transmitted from said driving rotatable member to said photosensitive drum through engagement between said hole and said projection, and said projection is urged inwardly of said hole, wherein said engaging portion is contacted to said twisted surfaces at at least three points, and wherein said end of said photosensitive drum is provided with a drum gear which is effective to transmit a driving force received by said engaging portion from the main assembly to said developing roller.

59. An electrophotographic photosensitive drum usable with a process cartridge which is detachably mountable to a main assembly of an electrophotographic image forming apparatus, the main assembly being provided with a hole defined by twisted surfaces, said photosensitive drum comprising:

a cylinder having a photosensitive layer on a circumferential surface thereof;

an end flange provided at a longitudinal end of said cylinder, said end flange being provided with a support base; and driving force receiving means including a plurality of engaging portions which are engageable to the twisted surfaces to receive rotational driving force, and supporting means extending from said supporting base to said engaging portions to support said engaging portions, wherein said supporting means extends longitudinally outwardly and radially outwardly.

60. An electrophotographic photosensitive drum according to claim 59, wherein said supporting means includes a longitudinally extending shaft and a plurality of arms extending perpendicularly from said shaft.

61. An electrophotographic photosensitive drum according to claim 59, wherein said supporting means includes a truncated trigonal pyramid expanding outwardly.

62. An electrophotographic photosensitive drum according to claim 59, wherein said engaging portions have rounded surfaces.

63. An electrophotographic photosensitive drum according to any one of claims 59–62, wherein the number of said plurality of engaging portions is three.

64. An electrophotographic photosensitive drum usable with a process cartridge which is detachably mountable to a main assembly of an electrophotographic image forming apparatus, the main assembly being provided with a hole defined by twisted surfaces, said photosensitive drum comprising:

a cylinder having a photosensitive layer on a circumferential surface thereof;

an end flange provided at a longitudinal end of said cylinder, said end flange being provided with a supporting base; and driving force receiving means including a plurality of engaging portions which are engageable to the twisted surfaces to receive rotational driving force, and supporting arms extending from said supporting base to said engaging portions to support said engaging portions, wherein said supporting arms extend radially outwardly.

65. An electrophotographic photosensitive drum according to claim 64, wherein said base is in the form of a shaft from which said supporting arms extend perpendicularly.

66. An electrophotographic photosensitive drum according to claim 64, wherein said engaging portions have rounded surfaces.

67. An electrophotographic photosensitive drum according to any one of claims 64–65, wherein the number of said plurality of engaging portions is three.

68. A process cartridge detachably mountable to a main assembly of an electrophotographic image forming apparatus, wherein the main assembly includes a motor, a driving rotatable member for receiving driving force from the motor and a hole defined by twisted surfaces, the hole being substantially coaxial with the driving rotatable member, said process cartridge comprising:

an electrophotographic photosensitive drum; and process means actable on said photosensitive drum, wherein said electrophotographic photosensitive drum includes:
- a cylinder having a photosensitive layer on a circumferential surface thereof;
- an end flange provided at a longitudinal end of said cylinder, said end flange being provided with a supporting base; and
- driving force receiving means including a plurality of engaging portions which are engageable to the twisted surfaces to receive rotational driving force, and supporting means extending from said supporting base to said engaging portions to support said engaging portions, wherein said supporting means extends longitudinally outwardly and radially outwardly.

69. A process cartridge according to claim 68, wherein said supporting means includes a longitudinally extending shaft and a plurality of arms extending perpendicularly from said shaft.

70. A process cartridge according to claim 68, wherein said supporting means includes a truncated trigonal pyramid expanding outwardly.

71. A process cartridge according to claim 68, wherein said engaging portions have rounded surfaces.

72. A process cartridge according to any one of claims 68–71, wherein the number of said plurality of engaging portions is three.

73. A process cartridge detachably mountable to a main assembly of an electrophotographic image forming apparatus, wherein the main assembly includes a motor, a driving rotatable member for receiving driving force from the motor and a hole defined by twisted surfaces, the hole being substantially coaxial with the driving rotatable member, said process cartridge comprising:

an electrophotographic photosensitive drum; and process means actable on said photosensitive drum, wherein said electrophotographic photosensitive drum includes:
- a cylinder having a photosensitive layer on a circumferential surface thereof;
- an end flange provided at a longitudinal end of said cylinder, said end flange being provided with a supporting base; and
- driving force receiving means including a plurality of engaging portions which are engageable to the twisted surfaces to receive rotational driving force, and supporting arms extending from said supporting base to said engaging portions to support said engaging portions, wherein said supporting arms extends radially outwardly.

74. A process cartridge according to claim 73, wherein said supporting base is in the form of a shaft from which said supporting arms extend perpendicularly.

75. A process cartridge according to claim 73, wherein said engaging portions have rounded surfaces.

76. A process cartridge according to any one of claims 73–75, wherein the number of said plurality of engaging portions is three.

77. A process cartridge according to claim 68 or 73, wherein said process means includes at least one of a charging member for charging said photosensitive drum, a developing member for developing a latent image formed on said photosensitive drum, and a cleaning member for removing toner remaining on said photosensitive drum.

78. An electrophotographic image forming apparatus for forming an image on a recording material, to which a process cartridge is detachably mountable, said apparatus comprising:

(a) a motor;

(b) a driving rotatable member for receiving driving force from said motor;

(c) a hole defined by twisted surfaces, said hole being substantially coaxial with said driving rotatable member; and (d) a mounting member for mounting the process cartridge, which includes:

a rotatable electrophotographic photosensitive drum; and process means actable on said photosensitive drum, wherein said photosensitive drum includes:
- a cylinder having a photosensitive layer on a circumferential surface thereof;
- an end flange provided at a longitudinal end of said cylinder, said end flange being provided with a supporting base; and
- driving force receiving means including a plurality of engaging portions which are engageable to said twisted surfaces to receive rotational driving force, and supporting means extending from said supporting base to said engaging portions to support said engaging portions, wherein said supporting means extends longitudinally outwardly and radially outwardly.

79. An electrophotographic image forming apparatus for forming an image on a recording material, to which a process cartridge is detachably mountable, said apparatus comprising:

(a) a motor;

(b) a driving rotatable member for receiving driving force from said motor;

(c) a hole defined by twisted surfaces, said hole being substantially coaxial with said driving rotatable member; and (d) a mounting member for mounting the process cartridge, which includes:

a rotatable electrophotographic photosensitive drum; and process means actable on said photosensitive drum, wherein said photosensitive drum includes:
- a cylinder having a photosensitive layer on a circumferential surface thereof;
- an end flange provided at a longitudinal end of said cylinder, said end flange being provided with a supporting base; and
- driving force receiving means including a plurality of engaging portions which are engageable to said twisted surfaces to receive rotational driving force, and supporting arms extending from said supporting base to said engaging portions to support said engaging portions, wherein said supporting arms extend radially outwardly.

* * * * *

UNITED STATES PATENT AND TRADEMARK OFFICE
CERTIFICATE OF CORRECTION

PATENT NO. : 6,336,018 B1
DATED : January 1, 2002
INVENTOR(S) : Toshiharu Kawai et al.

It is certified that error appears in the above-identified patent and that said Letters Patent is hereby corrected as shown below:

Column 3,
Line 45, "embodiments" should read -- embodiment --.

Column 6,
Line 36, "extend" should read -- extended --.
Line 46, "18c" should read -- 118c --.

Column 7,
Line 39, "an" should read -- a --.

Column 8,
Line 36, "of a" should read -- of --.
Line 42, "guides" should read -- guide --.

Column 9,
Line 38, "woods" should read -- woods, --.
Line 58, "116a" should read -- 116R --.
Line 59, "16a and 16c," should read -- 116a and 116c, --.
Line 60, "16d" should read -- 116d --.

Column 12,
Line 15, "toga" should read -- to a --.
Line 51, "generates," should read -- generates --.

Column 13,
Line 59, "the listed" should read -- that listed --.

Column 14,
Line 25, "16c" should read -- 116c --.
Line 35, "7a" should read -- 7d --.

Column 15,
Line 38, "from" should read -- from the --.

Column 16,
Line 8, "that" should read -- that the --.

Column 17,
Line 22, "17ain" should read -- 17a in --.
Line 37, "triangle," should read -- triangles --.

UNITED STATES PATENT AND TRADEMARK OFFICE
CERTIFICATE OF CORRECTION

PATENT NO. : 6,336,018 B1
DATED : January 1, 2002
INVENTOR(S) : Toshiharu Kawai et al.

It is certified that error appears in the above-identified patent and that said Letters Patent is hereby corrected as shown below:

Column 18,
Line 29, "descried" should read -- described --.

Column 20,
Line 30, "illustrated" should read -- illustrated in --.
Line 41, "give" should read -- given --.

Column 21,
Line 9, "illustrated" should read -- illustrated in --.

Column 23,
Line 60, "sets" should read -- set --.

Column 24,
Line 3, "tone" should read -- toner --.
Line 4, "images," should read -- image, --.

Column 25,
Line 8, "2 or 3," should read -- 2, --.
Line 19, "defined by free ends of arms extended" should read -- spherical. --.
Lines 20-22 should be deleted.

Column 29,
Line 34, "at" should read -- at at --.

Column 31,
Line 57, "extends" should read -- extend --.

Signed and Sealed this

Seventh Day of May, 2002

*Attest:*

*Attesting Officer*

JAMES E. ROGAN
*Director of the United States Patent and Trademark Office*